US007740688B2

(12) United States Patent
Kumar

(10) Patent No.: US 7,740,688 B2
(45) Date of Patent: Jun. 22, 2010

(54) PROCESS AND APPARATUS FOR CARBON DIOXIDE RECOVERY

(75) Inventor: Ravi Kumar, Williamsville, NY (US)

(73) Assignee: Praxair Technology, Inc., Danbury, CT (US)

( * ) Notice: Subject to any disclaimer, the term of this patent is extended or adjusted under 35 U.S.C. 154(b) by 723 days.

(21) Appl. No.: 11/527,015

(22) Filed: Sep. 26, 2006

(65) Prior Publication Data

US 2008/0072752 A1 Mar. 27, 2008

(51) Int. Cl.
*B01D 53/02* (2006.01)

(52) U.S. Cl. ............................. 95/100; 95/103; 95/139

(58) Field of Classification Search ..................... 95/96, 95/100, 101, 102, 103, 139
See application file for complete search history.

(56) References Cited

U.S. PATENT DOCUMENTS

| | | | | |
|---|---|---|---|---|
| 4,171,206 A | 10/1979 | Sircar | 55/26 |
| 4,299,596 A | 11/1981 | Benkmann | 55/26 |
| 4,770,676 A | 9/1988 | Sircar et al. | 55/26 |
| 4,790,858 A | 12/1988 | Sircar | |
| 4,840,647 A | 6/1989 | Hay | 55/26 |
| 4,857,083 A | 8/1989 | DiMartino | 55/26 |
| 4,913,709 A | 4/1990 | Kumar | 55/26 |
| 4,915,711 A | 4/1990 | Kumar | |
| 4,952,223 A | 8/1990 | Kirshnamurthy et al. | |
| 5,000,925 A | 3/1991 | Krishnamurthy et al. | |
| 5,026,406 A | 6/1991 | Kumar | 55/26 |
| 5,051,115 A | 9/1991 | Leitgeb et al. | 55/26 |
| 5,133,785 A | 7/1992 | Kumar et al. | |
| 5,248,322 A | 9/1993 | Kumar | 95/101 |
| 5,294,247 A | 3/1994 | Scharpf et al. | |
| 5,354,346 A | 10/1994 | Kumar | 95/101 |
| 5,993,517 A * | 11/1999 | Chen et al. | 95/98 |
| 6,245,127 B1 | 6/2001 | Kane et al. | 95/101 |
| 6,500,241 B2 | 12/2002 | Reddy | |

(Continued)

FOREIGN PATENT DOCUMENTS

EP 0305919 A1 8/1989

(Continued)

OTHER PUBLICATIONS

International Search Report—PCT/US2007/079420, Mar. 26, 2008.

(Continued)

*Primary Examiner*—Robert A Hopkins
(74) *Attorney, Agent, or Firm*—Donald T. Black

(57) ABSTRACT

The present invention generally relates to vacuum pressure swing adsorption (VPSA) processes and apparatus to recover carbon dioxide having a purity of approximately ≧90 mole % from streams containing at least carbon dioxide and hydrogen (e.g., syngas). The feed to the $CO_2$ VPSA unit can be at super ambient pressure. The $CO_2$ VPSA unit produces three streams, a $H_2$-enriched stream, a $H_2$-depleted stream and a $CO_2$ product stream. When the $CO_2$ VPSA unit is installed between an SMR/shift reactor and a $H_2$ PSA unit, hydrogen recovery is expected to be increased by extracting $CO_2$, thereby increasing hydrogen partial pressure in the $H_2$ PSA feed. The stream from the $CO_2$ VPSA unit, normally used as fuel, is recycled as feed to increase $CO_2$ recovery. The recovered $CO_2$ can be further upgraded, sequestered or used in applications such as enhanced oil recovery (EOR).

85 Claims, 11 Drawing Sheets

System 20

U.S. PATENT DOCUMENTS

| | | | |
|---|---|---|---|
| 6,551,380 | B1 | 4/2003 | Reddy et al. |
| 2007/0227352 | A1 | 10/2007 | Kumar |
| 2007/0261551 | A1 | 11/2007 | Sawada et al. |

FOREIGN PATENT DOCUMENTS

| | | | |
|---|---|---|---|
| EP | 0620035 | A1 | 10/1994 |
| FR | 2872890 | | 1/2006 |
| GB | 2155805 | A | 10/1985 |
| WO | WO 99/35455 | | 7/1999 |

OTHER PUBLICATIONS

Takamura et al., "Evaluation of Dual-Bed Pressure Swing Adsorption for CO2 Recovery from Boiler Exhaust Gas", Separation Purification Technology 24 (2001), pp. 519-528.

Chou et al., "Carbon Dioxide Recovery by Vacuum Swing Adsorption", Separation and Purification Technology 39 (2004), pp. 51-65.

Reynolds et al., "New Pressure Swing Adsorption Cycles for Carbon Dioxide Sequestration", Adsorption 11 (2005), pp. 531-536.

Ko et al., "Optimization of Pressure Swing Adsorption and Fractionated Vacuum Pressure Swing Adsorption Processes for $CO_2$ Capture", Ind. Eng. Chem. Res. 44 (2005), pp. 8084-8094.

Zhang et al., "Experimental Pilot-scale Study of Carbon Dioxide Recovery from Flue Gas Streams by Vacuum Swing Adsorption", AIChE Meeting (2005).

Xiao et al., "Recovery of Carbon Dioxide from Flue Gas Streams by Vacuum Swing Adsorption", AIChE Meeting (2005).

* cited by examiner

| | 1 | 2 | 3 | 4 | 5 | 6 | 7 | 8 | 9 | 10 | 11 | 12 |
|---|---|---|---|---|---|---|---|---|---|---|---|---|
| A1 | FEED | | DP1 | DP2 | DP3/Recycle | | Evacuation | | PEv. | PE2 | PE1 | FeRP |
| A2 | PE1 | FeRP | FEED | | DP1 | DP2 | DP3/Recycle | | Evacuation | | PEv. | PE2 |
| A3 | PEv. | PE2 | PE1 | FeRP | FEED | | DP1 | DP2 | DP3/Recycle | | Evacuation | |
| A4 | Evacuation | | PEv. | PE2 | PE1 | FeRP | FEED | | DP1 | DP2 | DP3/Recycle | |
| A5 | DP3/Recycle | | Evacuation | | PEv. | PE2 | PE1 | FeRP | FEED | | DP1 | DP2 |
| A6 | DP1 | DP2 | DP3/Recycle | | Evacuation | | PEv. | PE2 | PE1 | FeRP | FEED | |

| Step | Description | Time | | | Pressure, psig Start | End |
|---|---|---|---|---|---|---|
| Feed | Total (Fresh + Recycle) Feed to $CO_2$ VPSA ----> Product as feed to $H_2$ PSA | t,feed = | 2 | min | 300 | 300 |
| DP1 | CoC DP1 to PE1 with an A bed | t,DP1= | 1 | min | 300 | 202 |
| DP2 | CoC DP2 to PE2 with an A bed | t,DP2= | 1 | min | 202 | 103 |
| DP3/Recy. | CoC / CCC DP to Recycle Compressor and increase $CO_2$ concentration in bed | t recy. = | 2 | min | 103 | 15 |
| Evac. | CCC Evac to collect **$CO_2$ product** | tevac = | 2 | min | 15 | 4 |
| PEv. | CCC PE with an A Bed on DP3/Recycle to increase $H_2/CO_2$ recovery | t,PEv= | 1 | min | 4 | 6 |
| PE2 | CCC PE2 with an A bed on DP2 to increase $H_2/CO_2$ recovery | t,PE2= | 1 | min | 6 | 103 |
| PE1 | CCC PE1 with an A bed on DP1 to increase $H_2/CO_2$ recovery | t,PE1= | 1 | min | 6 | 202 |
| FeRP | CcC RP by Feed Effluent | t,RP= | 1 | min | 202 | 300 |
| | | | 12 | min | | |

CCC PE with an A Bed on DP2 to increase

FIG. 2

| Step # | Time, sec From | To | Duration | BED A1 | BED A2 | BED A3 | BED A4 | BED A5 | BED A6 |
|---|---|---|---|---|---|---|---|---|---|
| 1 | 0 | 30 | 30 | Feed | PE1 | PEv | Evac. | DP/Recy. | DP1 |
| 2 | 30 | 60 | 30 | Feed | PE1 | PEv | Evac. | DP/Recy. | DP1 |
| 3 | 60 | 90 | 30 | Feed | FeRP | PE2 | Evac. | DP/Recy. | DP2 |
| 4 | 90 | 120 | 30 | Feed | FeRP | PE2 | Evac. | DP/Recy. | DP2 |
| 5 | 120 | 150 | 30 | DP1 | Feed | PE1 | PEv | Evac. | DP/Recy. |
| 6 | 150 | 180 | 30 | DP1 | Feed | PE1 | PEv | Evac. | DP/Recy. |
| 7 | 180 | 210 | 30 | DP2 | Feed | FeRP | PE2 | Evac. | DP/Recy. |
| 8 | 210 | 240 | 30 | DP2 | Feed | FeRP | PE2 | Evac. | DP/Recy. |
| 9 | 240 | 270 | 30 | DP/Recy. | DP1 | Feed | PE1 | PEv | Evac. |
| 10 | 270 | 300 | 30 | DP/Recy. | DP1 | Feed | PE1 | PEv | Evac. |
| 11 | 300 | 330 | 30 | DP/Recy. | DP2 | Feed | FeRP | PE2 | Evac. |
| 12 | 330 | 360 | 30 | DP/Recy. | DP2 | Feed | FeRP | PE2 | Evac. |
| 13 | 360 | 390 | 30 | Evac. | DP/Recy. | DP1 | Feed | PE1 | PEv |
| 14 | 390 | 420 | 30 | Evac. | DP/Recy. | DP1 | Feed | PE1 | PEv |
| 15 | 420 | 450 | 30 | Evac. | DP/Recy. | DP2 | Feed | FeRP | PE2 |
| 16 | 450 | 480 | 30 | Evac. | DP/Recy. | DP2 | Feed | FeRP | PE2 |
| 17 | 480 | 510 | 30 | PEv | Evac. | DP/Recy. | DP1 | Feed | PE1 |
| 18 | 510 | 540 | 30 | PEv | Evac. | DP/Recy. | DP1 | Feed | PE1 |
| 19 | 540 | 570 | 30 | PE2 | Evac. | DP/Recy. | DP2 | Feed | FeRP |
| 20 | 570 | 600 | 30 | PE2 | Evac. | DP/Recy. | DP2 | Feed | FeRP |
| 21 | 600 | 630 | 30 | PE1 | PEv | Evac. | DP/Recy. | DP1 | Feed |
| 22 | 630 | 660 | 30 | PE1 | PEv | Evac. | DP/Recy. | DP1 | Feed |
| 23 | 660 | 690 | 30 | FeRP | PE2 | Evac. | DP/Recy. | DP2 | Feed |
| 24 | 690 | 720 | 30 | FeRP | PE2 | Evac. | DP/Recy. | DP2 | Feed |

FIG. 4a

Option a

| | | | | | | | | | | | | |
|---|---|---|---|---|---|---|---|---|---|---|---|---|
| A1 | FEED | | DP1 | Recy. DP2 | DP3 | | Evacuation | | PEv | | PE1 | FeRP |
| A2 | PE1 | FeRP | FEED | | DP1 | Recy. DP2 | DP3 | | Evacuation | | PEv | |
| A3 | PEv | | PE1 | FeRP | FEED | | DP1 | Recy. DP2 | DP3 | | Evacuation | |
| A4 | Evacuation | | PEv | | PE1 | FeRP | FEED | | DP1 | Recy. DP2 | DP3 | |
| A5 | DP3 | | Evacuation | | PEv | | PE1 | FeRP | FEED | | DP1 | Recy. DP2 |
| A6 | DP1 | Recy. DP2 | DP3 | | Evacuation | | PEv | | PE1 | FeRP | FEED | |

Option b

| | | | | | | | | | | | | |
|---|---|---|---|---|---|---|---|---|---|---|---|---|
| A1 | FEED | | DP1 | Recycle DP2 | | DP3 | Evacuation | | Idle | PEv | PE1 | FeRP |
| A2 | PE1 | FeRP | FEED | | DP1 | Recycle DP2 | | DP3 | Evacuation | | Idle | PEv |
| A3 | Idle | PEv | PE1 | FeRP | FEED | | DP1 | Recycle DP2 | | DP3 | Evacuation | |
| A4 | Evacuation | | Idle | PEv | PE1 | FeRP | FEED | | DP1 | Recycle DP2 | | DP3 |
| A5 | Recy. DP2 | DP3 | Evacuation | | Idle | PEv | PE1 | FeRP | FEED | | DP1 | Recy. DP2 |
| A6 | DP1 | Recycle DP2 | | DP3 | Evacuation | | Idle | PEv | PE1 | FeRP | FEED | |

| | |
|---|---|
| Feed | Total (Fresh + Recycle) Feed to CO2 VPSA ----> Product as feed to H2 PSA |
| DP1 | CoC DP1 to PE1 with an A bed |
| Recy. DP2 | CCC/CoC DP2 Recyle to Feed |
| DP3 | CoC DP3 to increase CO2 concentration in the bed and PE with an evacuated bed |
| Evac. | CcC Evac to collect **CO2 product** |
| Idle | |
| PEv | CCC PE with an A Bed on DP3 to increase H2/CO2 recovery |
| PE1 | CCC PE1 with an A bed on DP1 to increase H2/CO2 recovery |
| FeRP | CCC RP by Feed Effluent |

| Option # | a | | b |
|---|---|---|---|
| t,feed = | 2 | min | 2 |
| t,DP1= | 1 | min | 1 |
| t recy.= | 1 | min | 2 |
| t,DP3 = | 2 | min | 1 |
| tevac = | 2 | min | 2 |
| t, Idle = | 0 | min | 1 |
| t,PEv= | 2 | min | 1 |
| t,PE1= | 1 | min | 1 |
| t,RP= | 1 | min | 1 |
| | 12 | min | 12 |

FIG. 5

Option a

| | | | | | | | | | | | |
|---|---|---|---|---|---|---|---|---|---|---|---|
| A1 | FEED | DP1 | DP2 | Recy. DP3 | DP4 | Evacuation | PEv | PE2 | PE1 | FeRP | |
| A2 | PE1 | FeRP | FEED | DP1 | DP2 | Recy. DP3 | DP4 | Evacuation | PEv | PE2 | |
| A3 | PEv | PE2 | PE1 | FeRP | FEED | DP1 | DP2 | Recy. DP3 | DP4 | Evacuation | PEv |
| A4 | Evac. | PEv | PE2 | PE1 | FeRP | FEED | DP1 | DP2 | Recy. DP3 | DP4 | Evac. |
| A5 | DP4 | Evacuation | PEv | PE2 | PE1 | FeRP | FEED | DP1 | DP2 | Recy. DP3 | DP4 |
| A6 | Recy. DP3 | DP4 | Evacuation | PEv | PE2 | PE1 | FeRP | FEED | DP1 | DP2 | |
| A7 | DP1 | DP2 | Recy. DP3 | DP4 | Evacuation | PEv | PE2 | PE1 | FeRP | FEED | |

Option b

| | | | | | | | | | | | | |
|---|---|---|---|---|---|---|---|---|---|---|---|---|
| A1 | FEED | DP1 | DP2 | Recy. DP3 | DP4 | Evacuation | Idle | PEv | PE2 | PE1 | FeRP | |
| A2 | PE1 | FeRP | FEED | DP1 | DP2 | Recy. DP3 | DP4 | Evacuation | Idle | PEv | PE2 | |
| A3 | PEv | PE2 | PE1 | FeRP | FEED | DP1 | DP2 | Recy. DP3 | DP4 | Evacuation | Idle | |
| A4 | Evac. | Idle | PEv | PE2 | PE1 | FeRP | FEED | DP1 | DP2 | Recy. DP3 | DP4 | Evac. |
| A5 | DP4 | Evacuation | Idle | PEv | PE2 | PE1 | FeRP | FEED | DP1 | DP2 | Recy. DP3 | |
| A6 | Recy. DP3 | DP4 | Evacuation | Idle | PEv | PE2 | PE1 | FeRP | FEED | DP1 | DP2 | |
| A7 | DP1 | DP2 | Recy. DP3 | DP4 | Evacuation | Idle | PEv | PE2 | PE1 | FeRP | FEED | |

| | |
|---|---|
| Feed | Total (Fresh + Recycle) Feed to CO2 VPSA ---> Product as feed to H2 PSA |
| DP1 | CoC DP1 to PE1 with an A bed |
| DP2 | CoC DP2 to PE2 with an A bed |
| Recy. DP3 | CCC/CoC DP3 Recyle to Feed |
| DP4 | CoC DP4 to increase CO2 concentration in the bed and PE with an evacuated bed |
| Evac. | CcC Evac to collect **CO2 product** |
| Idle | |
| PEv | CCC PE with an A Bed on DP4 to increase H2/CO2 recovery |
| PE2 | CCC PE2 with an A bed on DP2 to increase H2/CO2 recovery |
| PE1 | CCC PE1 with an A bed on DP1 to increase H2/CO2 recovery |
| FeRP | CCC RP by Feed Effluent |

| Option # | a | | b |
|---|---|---|---|
| t,feed = | 2 | min | 2 |
| t,DP1= | 1 | min | 1 |
| t,DP2= | 1 | min | 1 |
| t, recy.= | 1 | min | 2 |
| t,DP4 = | 2 | min | 1 |
| tevac = | 2 | min | 2 |
| t, Idle = | 0 | min | 1 |
| t,PEv= | 2 | min | 1 |
| t,PE2= | 1 | min | 1 |
| t,PE1= | 1 | min | 1 |
| t,RP= | 1 | min | 1 |
| | 14 | min | 14 |

FIG. 6

A1 | FEED | DP1 | DP2 | R/ DP3 | BD | Evacuation | PE2 | PE1 | FeRP

A2 | PE1 | FeRP | FEED | DP1 | DP2 | R/ DP3 | BD | Evacuation | PE2

A3 | Evacuation | PE2 | PE1 | FeRP | FEED | DP1 | DP2 | R/ DP3 | BD | Evacuatic

A4 | R/ DP3 | BD | Evacuation | PE2 | PE1 | FeRP | FEED | DP1 | DP2

A5 | DP1 | DP2 | R/ DP3 | BD | Evacuation | PE2 | PE1 | FeRP | FEED

| | | |
|---|---|---|
| Feed | Total (Fresh + Recycle) Feed to $CO_2$ VPSA ----> Product as feed to $H_2$ PSA | t,feed = 2 min |
| DP1 | CoC DP1 to PE1 with an A bed | t,DP1= 1 min |
| DP2 | CoC DP2 to PE2 with another of the A bed | t,DP2= 1 min |
| R/ DP3 | CoC / CCC DP3 to Recycle Compressor and increase $CO_2$ concentration in the bed | t recy. = 0.5 min |
| BD | CCC DP to collect pure **$CO_2$ product** from bottom | t,BD= 0.5 min |
| Evac. | CCC Evac to collect **$CO_2$ product** | tevac = 2 min |
| PE2 | CCC PE2 with an A Bed on DP2 to increase $H_2/CO_2$ recovery | t,PE2= 1 min |
| PE1 | CCC PE1 with an A bed on DP1 to increase $H_2/CO_2$ recovery | t,PE1= 1 min |
| FeRP | CcC RP by Feed Effluent | t,RP= 1 min |
| | | 10 min |

FIG. 7

| | | | | | | | | | | | | |
|---|---|---|---|---|---|---|---|---|---|---|---|---|
| A1 | FEED | | DP1 | DP2 | DP3 | R/ DP4 \| BD | Evacuation | | PE3 | PE2 | PE1 | FeRP |
| A2 | PE1 | FeRP | FEED | | DP1 | DP2 | DP3 | R/ DP4 \| BD | Evacuation | | PE3 | PE2 |
| A3 | PE3 | PE2 | PE1 | FeRP | FEED | | DP1 | DP2 | DP3 | R/ DP4 \| BD | Evacuation | |
| A4 | Evacuation | | PE3 | PE2 | PE1 | FeRP | FEED | | DP1 | DP2 | DP3 | R/ DP4 \| BD |
| A5 | DP3 | R/ DP4 \| BD | Evacuation | | PE3 | PE2 | PE1 | FeRP | FEED | | DP1 | DP2 |
| A6 | DP1 | DP2 | DP3 | R/ DP4 \| BD | Evacuation | | PE3 | PE2 | PE1 | FeRP | FEED | |

| | | |
|---|---|---|
| Feed | Total (Fresh + Recycle) Feed to $CO_2$ VPSA ----> Product as feed to $H_2$ PSA | t,feed = 2 min |
| DP1 | CoC DP1 to PE1 with an A bed | t,DP1= 1 min |
| DP2 | CoC DP2 to PE2 with another of the A bed | t,DP2= 1 min |
| DP3 | CoC DP3 to PE3 with another of the A bed | t,DP3= 1 min |
| R/ DP4 | CoC / CCC DP4 to Recycle Compressor and increase $CO_2$ concentration in the bed | t recy. = 0.5 min |
| BD | CCC DP to collect pure **$CO_2$ product** from bottom | t,BD= 0.5 min |
| Evac. | CCC Evac to collect **$CO_2$ product** | tevac = 2 min |
| PE3 | CCC PE3 with an A Bed on DP3 to increase $H_2/CO_2$ recovery | t,PE3= 1 min |
| PE2 | CCC PE2 with an A Bed on DP2 to increase $H_2/CO_2$ recovery | t,PE2= 1 min |
| PE1 | CCC PE1 with an A bed on DP1 to increase $H_2/CO_2$ recovery | t,PE1= 1 min |
| FeRP | CCC RP by Feed Effluent | t,RP= 1 min |
| | | 12 min |

FIG. 8

| | | | | | | | | | | |
|---|---|---|---|---|---|---|---|---|---|---|
| A1 | FEED | | DP1 | DP2 | Recy/ DP3 | Evacuation | | PE2 | PE1 | FeRP |
| A2 | PE1 | FeRP | FEED | | DP1 | DP2 | Recy/ DP3 | Evacuation | | PE2 |
| A3 | Evacuation | PE2 | PE1 | FeRP | FEED | | DP1 | DP2 | Recy/ DP3 | Evacuation |
| A4 | Recy/ DP3 | Evacuation | | PE2 | PE1 | FeRP | FEED | | DP1 | DP2 |
| A5 | DP1 | DP2 | Recy/ DP3 | Evacuation | | PE2 | PE1 | FeRP | FEED | |

| | | | | |
|---|---|---|---|---|
| Feed | Total (Fresh + Recycle) Feed to $CO_2$ VPSA ----> Product as feed to $H_2$ PSA | **t,feed =** | 2 | min |
| DP1 | CoC DP1 to PE1 with an A bed | **t,DP1=** | 1 | min |
| DP2 | CoC DP2 to PE2 with another of the A bed | **t,DP2=** | 1 | min |
| Recy/DP3 | CoC / CCC DP3 to Recycle Compressor and increase $CO_2$ concentration in the bed | **t recy. =** | 1 | min |
| Evac. | CCC Evac to collect **$CO_2$ product** | **tevac =** | 2 | min |
| PE2 | CCC PE2 with an A Bed on DP2 to increase $H_2/CO_2$ recovery | **t,PE2=** | 1 | min |
| PE1 | CCC PE1 with an A bed on DP1 to increase $H_2/CO_2$ recovery | **t,PE1=** | 1 | min |
| FeRP | CCC RP by Feed Effluent | **t,RP=** | 1 | min |
| | | | 10 | min |

FIG. 9

| | | | | | | | | | | | | |
|---|---|---|---|---|---|---|---|---|---|---|---|---|
| A1 | FEED | | DP1 | DP2 | DP3 | Rec./DP4 | Evacuation | | PE3 | PE2 | PE1 | FeRP |
| A2 | PE1 | FeRP | FEED | | DP1 | DP2 | DP3 | Rec./DP4 | Evacuation | | PE3 | PE2 |
| A3 | PE3 | PE2 | PE1 | FeRP | FEED | | DP1 | DP2 | DP3 | Rec./DP4 | Evacuation | |
| A4 | Evacuation | | PE3 | PE2 | PE1 | FeRP | FEED | | DP1 | DP2 | DP3 | Rec./DP4 |
| A5 | DP3 | Rec./DP4 | Evacuation | | PE3 | PE2 | PE1 | FeRP | FEED | | DP1 | DP2 |
| A6 | DP1 | DP2 | DP3 | Rec./DP4 | Evacuation | | PE3 | PE2 | PE1 | FeRP | FEED | |

| | |
|---|---|
| Feed | Total (Fresh + Recycle) Feed to $CO_2$ VPSA ----> Product as feed to $H_2$ PSA |
| DP1 | CoC DP1 to PE1 with an A bed |
| DP2 | CoC DP2 to PE2 with another of the A bed |
| DP3 | CoC DP3 to PE3 with another of the A bed |
| Rec./DP4 | CoC / CCC DP4 to Recycle Compressor and increase $CO_2$ concentration in the bed |
| Evac. | CcC Evac to collect **$CO_2$ product** |
| PE3 | CCC PE3 with an A Bed on DP3 to increase $H_2/CO_2$ recovery |
| PE2 | CCC PE2 with an A Bed on DP2 to increase $H_2/CO_2$ recovery |
| PE1 | CCC PE1 with an A bed on DP1 to increase $H_2/CO_2$ recovery |
| FeRP | CcC RP by Feed Effluent |

| | | |
|---|---|---|
| **t,feed =** | 2 | min |
| **t,DP1=** | 1 | min |
| **t,DP2=** | 1 | min |
| **t,DP3=** | 1 | min |
| **t recy. =** | 1 | min |
| **tevac =** | 2 | min |
| **t,PE3=** | 1 | min |
| **t,PE2=** | 1 | min |
| **t,PE1=** | 1 | min |
| **t,RP=** | 1 | min |
| | 12 | min |

FIG. 10

PROCESS AND APPARATUS FOR CARBON DIOXIDE RECOVERY

FIELD OF THE INVENTION

The present invention generally relates to a vacuum pressure swing adsorption (VPSA) process and apparatus to recover carbon dioxide having a purity of approximately ≧90 mole percent from streams containing at least carbon dioxide and hydrogen (e.g., syngas). The feed to the $CO_2$ VPSA unit can be at super ambient pressure.

BACKGROUND OF THE INVENTION

Steam methane reforming (SMR) is the primary process to produce hydrogen ($H_2$) in bulk quantities. After catalytic conversion of natural gas, carbon monoxide and hydrogen is produced as follows in equation (1):

$$CH_4+H_2O \Leftrightarrow CO+3H_2. \quad (1)$$

The gas mixture is shifted (by a water-gas shift reaction) to further produce $H_2$ according to equation (2):

$$CO+H_2O \Leftrightarrow CO_2+H_2. \quad (2)$$

After the water-gas shift reaction, typical product gas has a pressure of between about 100-500 psia, a temperature of between about 60-150° F., and a composition of 60-80 mole percent $H_2$, 15-25 mole percent $CO_2$, 0.1-5 mole percent CO, 3-7 mole percent $CH_4$, 0-5 mole percent $N_2$ and is saturated with water.

This gas mixture can then be fed to a pressure swing adsorption (PSA) unit to produce high purity $H_2$ (e.g., hydrogen at a purity of at least 99%).

In some current $H_2$ production plants, an amine unit is placed between the shift reactor and the $H_2$ PSA unit to extract $CO_2$ from the stream produced by the shift reactor. This process, however, is energy intensive. In addition, amine units can be difficult to operate and are known to have operational problems, such as corrosion, loss of fluid and the like.

U.S. Pat. No. 4,171,206 relates to production of high purity $CO_2$ (99.99$^+$%) and high purity $H_2$ (99.99$^+$%) at high $CO_2$ (99.9$^+$%) recovery from SMR off-gas. This patent discloses two trains of adsorption beds, which are in communication with each other during the feed and re-pressurization steps. Beds in the $CO_2$ train employ a rinse step by high purity $CO_2$ at high pressure. Depressurization and evacuation of the same bed follow this step. Depressurized gas is re-compressed and used for high-pressure rinse. The effluent from the high pressure, high purity rinse step is recycled to the feed.

U.S. Pat. No. 4,299,596 relates to production of two products at high purity by employing two trains of beds, which are integrated during the feed and co-current depressurization steps. The train producing the more strongly adsorbed species is purged by the co-current depressurized gas after it has been recompressed. Part of the co-current depressurized gas may be recycled for re-pressurization. Evacuation and blowdown steps produce part of the more strongly adsorbed species and part of the purge gas.

U.S. Pat. No. 4,770,676 relates to the production of methane and carbon dioxide from landfill gas. It is an integrated thermal (TSA) and pressure swing adsorption (PSA) process. The waste produced from the PSA regenerates the TSA.

U.S. Pat. No. 4,840,647 relates to production of ≧95% carbon dioxide from a feed stream containing 10-30% $CO_2$ at ambient pressure. The process steps are feed, co-current evacuation, countercurrent evacuation to produce product and a repressurization step. Co-current evacuated gas is used for pressure equalizations/repressurization and mixed with the feed.

U.S. Pat. No. 4,857,083 considers production of carbon dioxide from a gas mixture. At the end of the feed step, the discharge end of the feed column is connected with the inlet end of the evacuated bed to reduce the pressure in this bed. $CO_2$ is then produced by evacuation. This is followed by pressure build up steps.

U.S. Pat. No. 4,913,709 relates to the production of two products at high purity. The reference suggests the use of two trains of beds, which are integrated during the feed and repressurization steps. The train producing the more strongly adsorbed species is purged by the more strongly adsorbed species obtained during the evacuation step. This purge is at low pressure and is carried out after the bed has been depressurized. Effluent during the purge step is recompressed and recycled as feed.

U.S. Pat. No. 4,915,711 discloses production of two products at high purity using a single train of beds. The bed is purged by the more strongly adsorbed species obtained during the evacuation step. This purge is at low pressure and is carried out after the bed has been depressurized. Effluent during the purge step and depressurization step is recompressed and recycled as feed.

U.S. Pat. No. 5,026,406 discloses the production of two products at high purity by employing a single train of beds. The bed is purged by the more strongly adsorbed species obtained during the evacuation step. This purge is at low pressure and is carried out after the bed has been depressurized. Effluent during the purge step and depressurization step is recompressed and recycled as feed.

U.S. Pat. No. 5,051,115 produces a more strongly adsorbed species from a gas mixture at high purity. A co-current purge step is employed by the high purity strongly adsorbed species. This purge stream and product are obtained during the evacuation step. Effluent from the purge step is recycled for repressurization.

U.S. Pat. No. 5,248,322 relates to a process with four steps: adsorption, depressurization, evacuation and pressure equalization by part of the depressurized gas and repressurization. The first part (higher pressure) of the depressurized gas is recycled whereas the second part (lower pressure) is used for pressure equalization.

U.S. Pat. No. 5,354,346 relates to a process with five steps: adsorption, depressurization, low pressure co-current purge, evacuation and pressure equalization by part of the depressurized and low pressure purge effluent gas and repressurization. The first part (higher pressure) of the depressurized gas is recycled whereas the second part (lower pressure) and part of the low pressure purge effluent gas is used for pressure equalization.

U.S. Pat. No. 6,245,127 discusses production of $CO_2$ from a low-pressure gas mixture at constant purity. It employs simultaneous purge and evacuation steps. The countercurrent purge is carried out by the less strongly adsorbed species. It would be desirable to provide economically beneficial processes and apparatus for $CO_2$ recovery. It would further be desirable for such processes and apparatus to be more efficient and easier to use relative to the prior art.

SUMMARY OF THE INVENTION

The present invention generally relates to a vacuum pressure swing adsorption (VPSA) process and apparatus for the recovery of carbon dioxide from a multi-component gas mixture comprising at least carbon dioxide and hydrogen in a VPSA unit comprising at least one adsorption bed containing at least one $CO_2$-selective adsorbent, comprising a series of depressurizations of an adsorbent from high pressure to low pressure to increase $CO_2$ concentration in the adsorbent bed. After the $CO_2$ concentration is increased, it produces the $CO_2$ product by further pressure reduction. The present invention teaches the use of depressurization of the adsorbent to significantly increase $CO_2$ concentration on the adsorbent. The addition of one or more depressurization steps eliminates the need for rinse or purge steps as used in the prior art. This in turn simplifies the process flow sheet and reduces process costs.

In order to increase $CO_2$ recovery and minimize $H_2$ losses, the present invention uses the depressurized gas to build up pressure in low pressure beds in the VPSA unit. Therefore, the bed depressurization increases $CO_2$ concentration in the product and by equalizing it with other beds at the same time, it also increases $CO_2$ recovery. Another feature of the present invention is that there are multiple depressurization steps, wherein the gas becomes more $CO_2$-rich with each depressurization and the resulting gas after the final depressurization step is $CO_2$-rich. This final depressurized gas is split into two parts, wherein one part is recompressed and recycled to the feed stream and the other part is used for further pressure build up with an evacuated bed. This step also increases $CO_2$ recovery.

Another feature of the present invention is that by reducing $CO_2$ in the feed stream to the $H_2$ pressure swing adsorption (PSA) unit, it also increases the recovery of $H_2$ from the $H_2$ PSA unit.

One embodiment of the present invention is a VPSA process for the recovery of carbon dioxide from a multi-component gas mixture comprising at least carbon dioxide and hydrogen (the feed stream) in a VPSA unit comprising at least one adsorption bed containing at least one $CO_2$-selective adsorbent, the process comprising:

(a) feeding at least a portion of the feed stream to the at least one adsorption bed at a first pressure within a first pressure range for a predetermined time to produce a hydrogen-enriched stream;

(b) depressurizing the at least one adsorption bed in a first depressurization step from the first pressure to a second pressure within a second pressure range wherein the second pressure is lower than the first pressure in a same direction as or in a direction opposite to the feed flow;

(c) depressurizing the at least one adsorption bed in a second depressurization step from the second pressure to a third pressure within a third pressure range wherein the third pressure is lower than the second pressure and in a same direction as or in a direction opposite to the feed flow;

(d) depressurizing the at least one adsorption bed in a third depressurization step from the third pressure to a fourth pressure within a fourth pressure range wherein the fourth pressure is lower than the third pressure and close to ambient pressure, and in a same direction as the feed flow or in a direction opposite the feed flow to produce a $CO_2$-rich stream, wherein a first portion of the $CO_2$-rich stream is compressed and recycled into the feed stream and feeding the feed stream with said recycled first portion to the at least one adsorption bed at a first pressure within a first pressure range for a predetermined time to produce a hydrogen-enriched stream; and (e) evacuating the at least one adsorption bed from the fourth pressure range to a pressure below ambient in a direction opposite or in a same direction as the feed flow to produce $CO_2$ product;

(f) feeding a second portion of the $CO_2$-rich stream of step (d) to the at least one adsorption bed at a pressure below ambient of step (e) to equalize the pressure in said bed;

(g) pressure equalizing the at least one adsorption bed in a first pressure equalization step in a direction opposite or in a same direction as the feed flow;

(h) further pressure equalizing the at least one adsorption bed in a second pressure equalization step in a direction opposite or in a same direction as the feed flow; and (i) repressurizing the at least one adsorption bed in a repressurization step to the first pressure range;

wherein the process is repeated cyclically.

BRIEF DESCRIPTION OF THE DRAWINGS

For a more complete understanding of the present invention and the advantages thereof, reference should be made to the following Detailed Description taken in conjunction with the accompanying drawings in which:

FIG. 2 illustrates a cycle step chart for $CO_2$ VPSA unit having six beds, partial recycle, two pressure equalization steps and pressure equalization of the evacuated bed in accordance with one embodiment of the present invention;

FIGS. 4*a* and 4*b* show the valve sequence for the operation of the $CO_2$ VPSA unit shown in FIGS. 2 and 3;

FIG. 5 illustrates an alternative cycle step chart for a $CO_2$ VPSA unit having six beds, partial recycle, one pressure equalization step and pressure equalization of the evacuated bed (Option a) and a variation of this alternative cycle step chart (Option b) in accordance with the present invention;

FIG. 6 illustrates another alternative cycle step chart for a $CO_2$ VPSA unit having seven beds, partial recycle, two pressure equalization steps and pressure equalization of the evacuated bed (Option a) and a variation of this alternative cycle step chart (Option b) in accordance with the present invention;

FIG. 7 illustrates another alternative cycle step chart for a $CO_2$ VPSA unit having five beds, partial depressurization, two pressure equalization steps and a partial recycle step in accordance with another embodiment of the present invention;

FIG. 8 illustrates another alternative cycle step chart for a $CO_2$ VPSA unit having six beds, partial depressurization, three pressure equalization steps and a partial recycle step in accordance with another embodiment of the present invention;

FIG. 9 illustrates another alternative cycle step chart for a $CO_2$ VPSA unit having five beds, total depressurization, two pressure equalization steps and a total recycle step in accordance with another embodiment of the present invention; and FIG. 10 illustrates another cycle step chart for a $CO_2$ VPSA unit having six beds, total depressurization, three pressure equalization steps and a total recycle step according to the present invention.

DETAILED DESCRIPTION OF THE INVENTION

The present invention generally relates to a vacuum pressure swing adsorption (VPSA) process and apparatus for the recovery of carbon dioxide from a multi-component gas mixture comprising at least carbon dioxide and hydrogen in a VPSA unit comprising at least one adsorption bed containing at least one $CO_2$-selective adsorbent, comprising a series of depressurizations of an adsorbent from high pressure to low pressure to increase $CO_2$ concentration in the adsorbent bed. After the $CO_2$ concentration is increased, it produces the $CO_2$ product by further pressure reduction. The present invention teaches the use of depressurization of the adsorbent to significantly increase $CO_2$ concentration on the adsorbent. The addition of one or more depressurization steps eliminates the need for rinse or purge steps as used in the prior art. This in turn simplifies the process flow sheet and reduces process costs.

In order to increase $CO_2$ recovery and minimize $H_2$ losses, the present invention uses the depressurized gas to build up pressure in low pressure beds in the VPSA unit. Therefore, the bed depressurization increases $CO_2$ concentration in the product and by equalizing it with other beds at the same time, it also increases $CO_2$ recovery. Another feature of the present invention is that the final depressurized gas, which is $CO_2$-rich, is split into two parts, wherein one part is recompressed and recycled to the feed stream and the other part is used for further pressure build up with an evacuated bed. This step also increases $CO_2$ recovery.

Another feature of the present invention is that by reducing $CO_2$ in the feed stream to the $H_2$ pressure swing adsorption (PSA) unit, it also increases the recovery of $H_2$ from the $H_2$ PSA unit.

As discussed in more detail herein, a significant feature of the process of the present invention is that the final depressurized gas is not wasted. Rather, this gas stream (which is now $CO_2$-rich) can be used in either of two ways or in combination thereof. First, a part of the final depressurized gas stream can be compressed and mixed with feed gas and the entire mixture is fed back to the $CO_2$ VPSA unit. Second, a part of the final depressurized gas stream is used to pressure equalize an adsorbent bed that has just been evacuated. In this embodiment, the evacuated gas from the evacuated adsorbent bed constitutes the $CO_2$ product. In this manner, $H_2$ loss from $CO_2$ VPSA is expected to be minimized or entirely eliminated.

Figure 1:
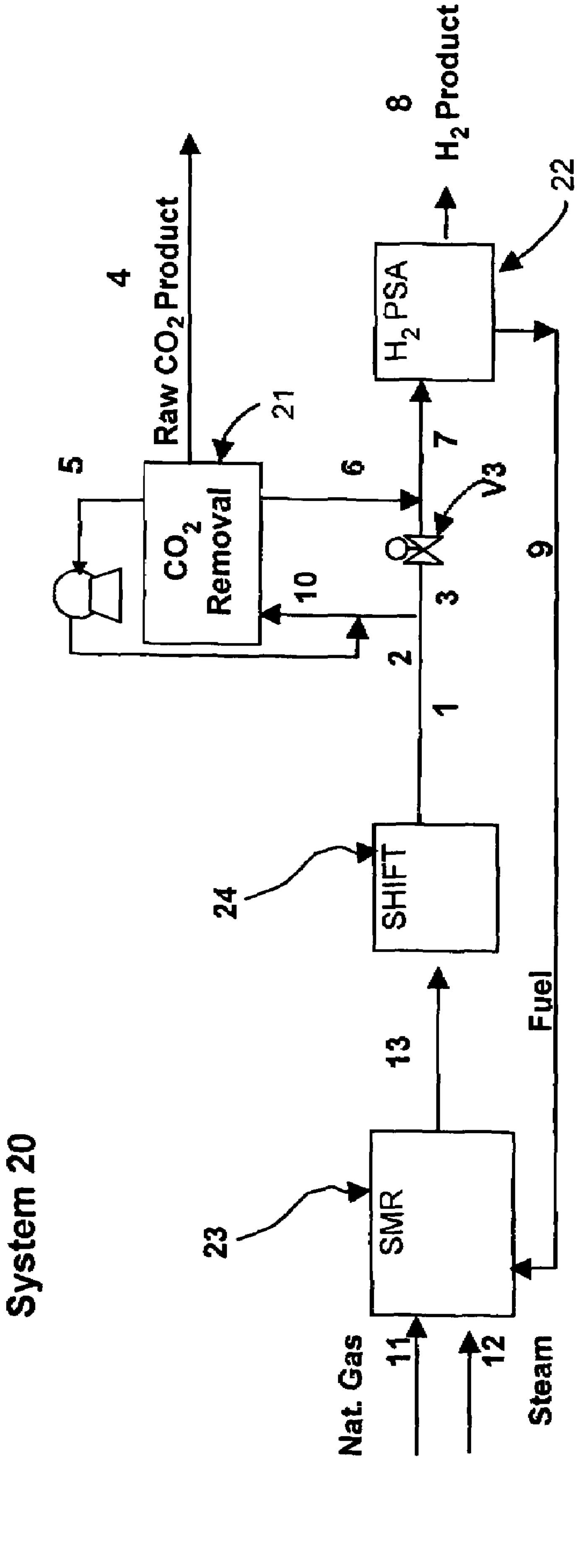
FIG. 1 illustrates an embodiment in accordance with the present invention in which a $CO_2$ VPSA unit is positioned upstream of a $H_2$ PSA unit.

In a preferred embodiment of the present invention and as illustrated in FIG. 1, system 20 includes $CO_2$ VPSA unit 21 positioned upstream of $H_2$ PSA unit 22. As discussed above, natural gas 11 and steam 12 can be reformed in steam methane reformer 23 to produce stream 13, as outlined in equation (1) hereinabove. Stream 13 is then fed to shift reactor 24 to produce stream 1 as outlined in equation (2), as also set forth above. Stream 1 can be fed to $CO_2$ VPSA unit 21 via stream 2. Valve V3 will therefore typically be in the closed position and is in the open position when the $CO_2$ VPSA unit is not being used. Those skilled in the art will appreciate that valve V3 may alternatively be in the partially open position depending on the desired process capacity (i.e., $CO_2$ recovery).

When the arrangement shown in FIG. 1 is used with processes and apparatus in accordance with the present invention, $CO_2$-rich stream 4 (e.g., ≧90 mole %) can be produced, together with hydrogen-rich feed 6 that is expected to result in higher hydrogen recovery 8 from $H_2$ PSA unit 22. Hydrogen PSA unit 22 can also produce fuel 9 for use in system 20.

The present invention recognizes that depressurizations of a $CO_2$-selective adsorbent layer increase the $CO_2$ concentration in the adsorbent bed(s). More specifically, the present invention recognizes and utilizes depressurizations of an adsorbent from high pressure (e.g., 100-500 psia) to low pressure(s) (i.e., close to ambient and/or subambient pressures) to increase $CO_2$ concentration in the bed.

As used herein, a "feed stream" being fed to a $CO_2$ unit in accordance with the present invention is a stream containing at least hydrogen and carbon dioxide at a pressure between about 100-500 psia (e.g., 300 psia). After the $CO_2$ concentration is increased by multiple depressurizations, it can be used to produce the $CO_2$ product by further pressure reduction. For some adsorbents, depressurization from high to low pressure increases $CO_2$ concentration in the adsorbent bed. This step in the process can be used to eliminate several process steps as described in the prior art. Consequently, several pieces of rotating machinery (e.g., rinse compressor, purge compressor) and associated power requirements can be eliminated, thus providing a process and system that enhances operation and improves efficiency.

Figure 3:
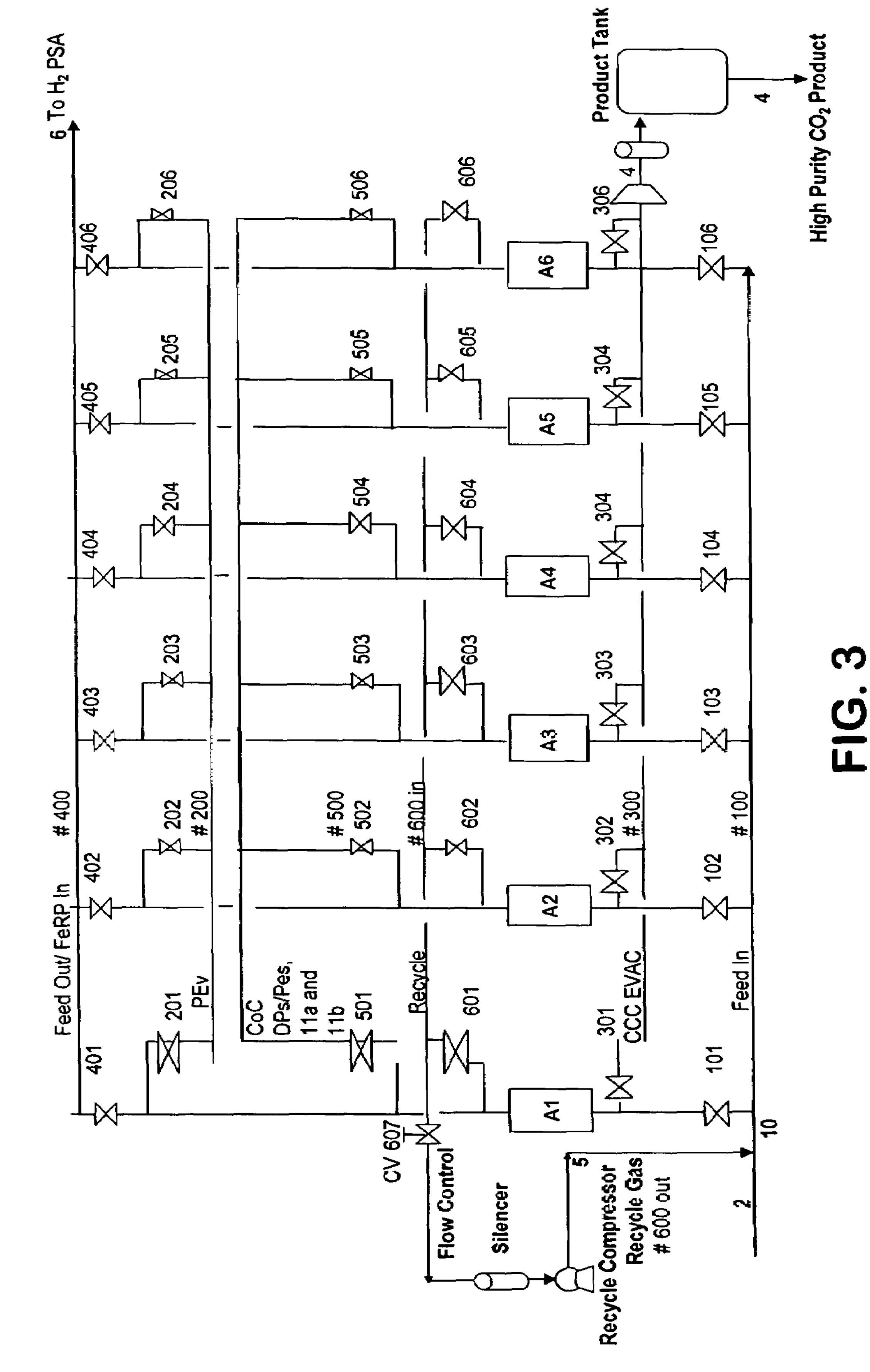
FIG. 3 shows a schematic drawing for $CO_2$ VPSA unit of FIG. 2.
Figure 4B:
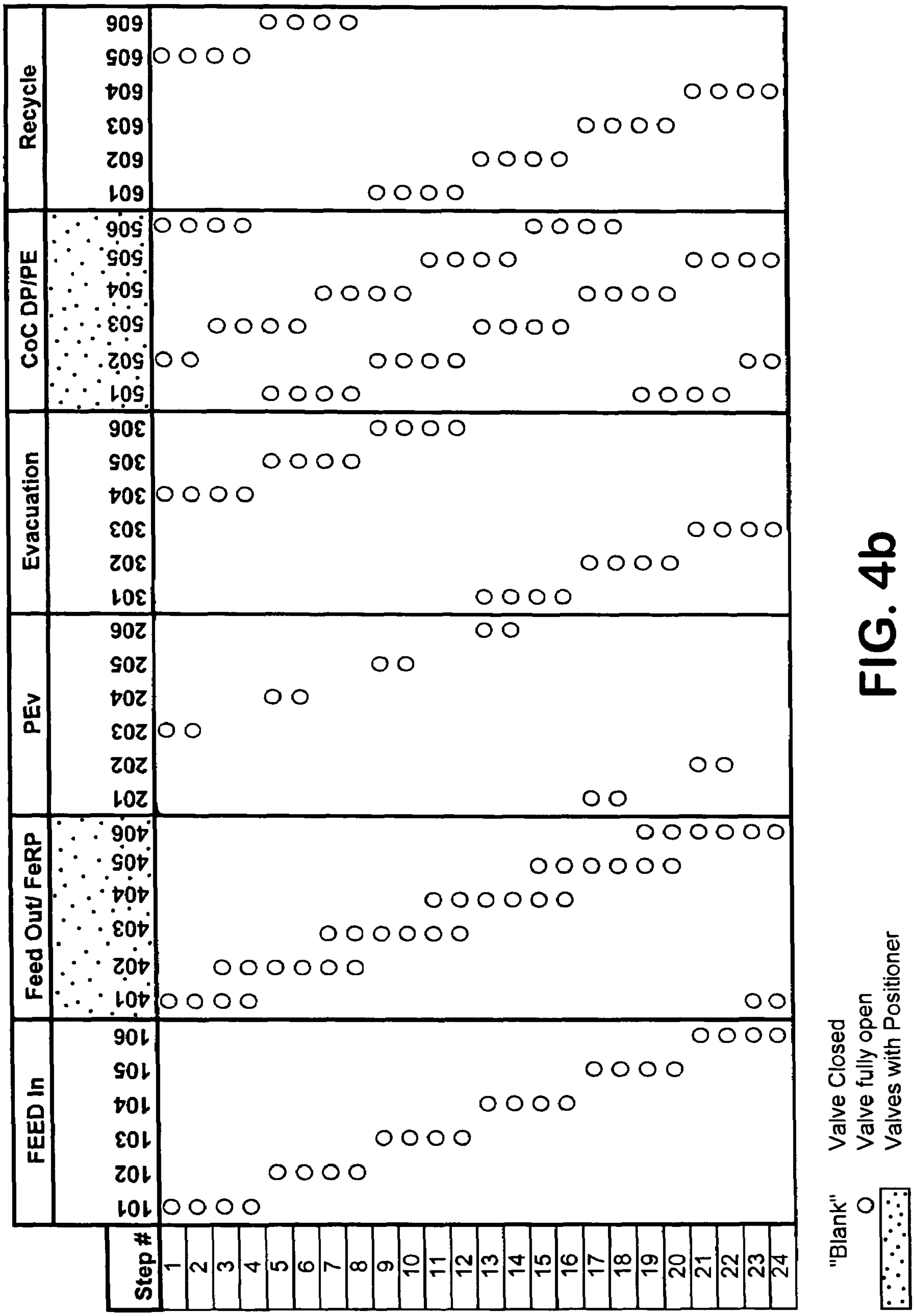

As mentioned above, the $CO_2$ VPSA processes and apparatus of the present invention can be used to produce $CO_2$ having a purity of about 90 mole percent from a feed gas such as a syngas. In one embodiment of the present invention, the processes provide for partial recycle of the $CO_2$-rich stream back into the $CO_2$ VPSA unit and pressure equalization of the evacuated bed by the $CO_2$-rich stream to increase $CO_2$ purity (see for example, FIGS. 2-6). These embodiments can be accomplished using a varying number of beds and pressure equalization steps. For example, the partial recycle and pressure equalization of the evacuated bed can be accomplished with six beds and two pressure equalization steps (FIGS. 2-4). Alternatively, partial recycle and pressure equalization of the evacuated bed can be accomplished with six beds and one pressure equalization step (FIG. 5) and seven beds and two pressure equalization steps (FIG. 6). Alternatively, partial recycle and blow down before evacuating the bed can be accomplished with five beds and two pressure equalization steps (FIG. 7), or six beds and three pressure equalization steps (FIG. 8). Alternatively, total recycle before evacuating the bed can be accomplished with five beds and two pressure equalization steps (FIG. 9), or six beds and three pressure equalization steps (FIG. 10). At any time during any of these processes, the beds will be in one of the following categories of steps: feed, depressurizations, evacuation, pressure equalizations, and repressurization.

In any of the embodiments, each bed is preferably packed with at least two layers of adsorbents. The type and sizing of the adsorbent layer toward the feed end (i.e., a water-selective adsorbent layer) in the bed is selected to remove moisture in the feed stream such that any residual moisture does not deteriorate the performance of the main (i.e., $CO_2$-selective) adsorbent layer. The water-selective adsorbent layer is also preferably capable of removing impurities (e.g., trace amounts of sulfur or heavy hydrocarbon compounds) from the feed stream, to the extent such impurities are present. The main, second adsorbent layer (i.e., the $CO_2$-selective adsorbent layer) is used for selectively adsorbing $CO_2$ from the feed stream after sufficient moisture has been removed.

For the first adsorbent layer (i.e., the water-selective adsorbent layer, adsorbents such as activated alumina, silica gel or zeolite molecular sieve are preferred. These adsorbents are intended to be illustrative and other adsorbents capable of removing sufficient moisture are also suitable for use in accordance with the present invention. Preferred characteristics for such adsorbent(s) include: high crush strength capabilities, high attrition resistance, large bulk density, low interparticle void, high heat capacity, large thermal conductivity, low-pressure drop and stable in liquid water.

The main layer of adsorbent (i.e., the $CO_2$-selective adsorbent layer) following the water-selective adsorbent layer preferably has the following characteristics: high selectivity, high working capacity, fast kinetics and low heat of adsorption. Typical examples of such adsorbents include, but are not limited to: are NaY, HY, NaX, silica gel, and activated carbon.

Other desired physical properties of the main layer adsorbent (i.e. the $CO_2$-selective layer) include: high crush strength, high attrition resistance, large bulk density, low inter-particle void, high heat capacity, large thermal conductivity and low-pressure drop during the feed and evacuation steps.

Those skilled in the art will appreciate that a composite mixed layer containing both adsorbents could be used in the present invention so long as the characteristics of the adsorbents are satisfied.

One embodiment (FIGS. 2 to 4) of the present invention is a VPSA process for the recovery of carbon dioxide from a multi-component gas mixture comprising at least carbon dioxide and hydrogen (the feed stream) in a VPSA unit comprising at least one adsorption bed containing at least one $CO_2$-selective adsorbent, the process comprising:

Step 1—Feed Step (Feed): The feed stream 1 (shown in FIG. 1) comprising at least carbon dioxide and hydrogen gases at a high pressure between about 100-500 psia (for example, about 300 psia) and produced by the shift reactor 24 is diverted to the $CO_2$ VPSA unit 21 of the present invention. High-pressure effluent 6 (i.e., a $H_2$-enriched stream) from the $CO_2$ VPSA unit 21 is sent to the $H_2$ PSA unit 22, which in turn produces high-pressure, high purity hydrogen product 8. After a predetermined time or after $CO_2$ breakthrough from the bed on the feed stream 10, the feed step is terminated.

Step 2—Depressurization 1 (DP1): The $CO_2$ VPSA bed, which has finished the feed step is now at high feed pressure (e.g., 100-500 psia), is depressurized to a medium pressure (e.g., 80-400 psia) in a direction the same (shown in FIG. 2, co-current (CoC)) or opposite to (not shown in FIG. 2, countercurrent (CCC)) the feed flow. This increases the $CO_2$ level in the gas stream.

Step 3—Depressurization 2 (DP2): The $CO_2$ VPSA bed, which is now at some medium pressure (e.g., 80-400 psia), is further depressurized to a lower pressure (e.g., 60-300 psia) in a direction the same as (shown in FIG. 2) or opposite to (not shown in FIG. 2) the feed flow. This further increases the $CO_2$ level in the gas stream.

Step 4—Depressurization 3 and Recycle (Recy.): The $CO_2$ VPSA bed, which is now at a pressure lower than at the start of Step 3 (e.g., 60-300 psia), is further depressurized to a lower pressure (e.g., 15-40 psia), in a direction the same as or opposite to the feed flow. Part of this further depressurized stream 5 (FIG. 1) is compressed and recycled into the fresh feed 2 and this mixed stream 10 is fed to the $CO_2$ VPSA unit 21. A second part of the further depressurized stream is flowed to the evacuated adsorbent bed to repressurize it as described below in Step 6.

Step 5—Evacuation (Evac.): The $CO_2$ VPSA bed, which is now at or close to ambient pressure (e.g., 15-40 psia), is evacuated to a predetermined low pressure in a direction opposite to the feed flow (shown in FIG. 2). The evacuation stream 4 (FIG. 1) constitutes $CO_2$ product.

Step 6—Pressure Equalization of Evacuated Bed (PEv): The evacuated bed is now pressure equalized from the second part of the further depressurized gas from Step 4 in a direction the same as (not shown in FIG. 2) or opposite to (shown in FIG. 2) the feed flow. This step helps to increase $CO_2$ recovery.

Step 7—Pressure Equalization 2 (PE2): The $CO_2$ VPSA bed is pressure equalized using the $CO_2$-rich stream of Step 3 in a direction the same as (not shown in FIG. 2) or opposite to (shown in FIG. 2) the feed flow. This step also helps to enhance $CO_2$ recovery.

Step 8—Pressure Equalization 1 (PE1): The $CO_2$ VPSA bed is further pressure equalized using the $CO_2$-rich stream of Step 2 in a direction the same as (not shown in FIG. 2) or opposite to (shown in FIG. 2) the feed flow. This step further helps to enhance $CO_2$ recovery.

Step 9—Repressurization (RP): The pressure equalized $CO_2$ VPSA bed is repressurized to feed pressure either by the feed gas 1 or by part of the effluent generated in Step 1. Following repressurization to feed pressure, this bed is now ready to repeat the cycle starting at Step 1.

The nine-step process described is for one cycle for one bed in the $CO_2$ VPSA unit. The above nine steps for this partial recycle/pressure equalization embodiment are carried out in a cyclic manner with the other beds in the unit such that feed-into and feed-effluent from Step 1, depressurization 3 and recycle (Step 4) and, the evacuation step (Step 5) are all continuous. This ensures that the recycle compressor and the vacuum pump operate continuously and that there is no break in feed-in to the $CO_2$ VPSA unit or to the $H_2$ PSA unit. Six adsorption beds are required in this embodiment of the invention in order to maintain the continuity of the key process steps. This may be achieved by the process configuration illustrated by the cycle time chart of FIG. 2.

Exemplary corresponding hardware and a flow schematic of the $CO_2$ VPSA process corresponding to the cycle shown FIG. 2 is depicted in FIG. 3. The various valves in FIG. 3 can be operated in the manner illustrated in FIGS. 4*a* and 4*b* to carry out the nine steps in the six-bed process as described hereinabove. It should be appreciated that pressures and step durations shown are only for illustrative purposes. Those skilled in the art will appreciate that other combinations of pressures and step durations may be used.

As can be appreciated from the above description, the present invention thus relies upon depressurizations of at least one $CO_2$-selective adsorbent from high pressure to low pressure to increase $CO_2$ concentration in the bed. After $CO_2$ concentration is increased, it produces the $CO_2$ product by further pressure reduction. This is possible based on the recognition that for some adsorbents, pressure reduction from high to low pressure increases $CO_2$ concentration on the adsorbent.

In the embodiment shown in FIGS. 2-4 and as described, the stream 5 (FIG. 1) of the gas produced during the depressurization 3 and recycle (Step 4) is compressed and mixed with feed gas and recycled through the $CO_2$ VPSA unit and another part flows through the bed under evacuation. By utilizing the final depressurization gas stream in this manner, there is minimal or no $H_2$ loss from the $CO_2$ VPSA unit.

Alternative and additional exemplary embodiments that utilize the partial recycle and final depressurization to the evacuated bed for pressure equalization are illustrated in FIGS. 5 and 6.

Referring now to FIG. 5, a cycle step chart for an eight-step process that utilizes six beds, partial recycle, one pressure equalization step and equalization with an evacuated bed is shown. These cycle steps are carried out in a manner similar to those steps described above with reference to FIG. 2, except that step PE2 has been eliminated and the depressurization and recycle step precedes the third depressurization step. More specifically, the cycle steps for FIG. 5, Option a includes the following:

Step 1—Feed Step (Feed): A feed stream 1 (shown in FIG. 1) containing at least carbon dioxide and hydrogen gases at a high pressure between about 100-500 psia (for example, about 300 psia) and produced by the shift reactor 24 is diverted to the $CO_2$ VPSA unit 21 of the present invention. High-pressure effluent 6 (i.e., a $H_2$-enriched stream) from the $CO_2$ VPSA unit 21 is sent to the $H_2$ PSA unit 22, which in turn produces high-pressure, high purity hydrogen product 8.

After a predetermined time or after $CO_2$ breakthrough from the bed on the feed stream 10, the feed step is terminated.

Step 2—Depressurization 1 (DP1): The $CO_2$ VPSA bed, which has finished the feed step is now at high feed pressure (e.g., 100-500 psia), is depressurized to a medium pressure (e.g., 80-400 psia) in a direction the same (shown in FIG. 5) or opposite to (not shown in FIG. 5) the feed flow.

Step 3—Depressurization 2 and Recycle (Recy.): The $CO_2$ VPSA bed, which is now at some medium pressure (e.g., 80-400 psia), is further depressurized to a lower pressure (e.g., 15-60 psia), in a direction the same as or opposite to the feed flow. This depressurized stream 5 (FIG. 1) is compressed and recycled into the fresh feed 2 and this mixed stream 10 is fed to the $CO_2$ VPSA unit 21.

Step 4—Depressurization 3 (DP3): The $CO_2$ VPSA bed, which is now at a pressure lower than at the start of Step 3 (e.g., 15-60 psia), is further depressurized to a lower pressure (e.g., 10-40 psia) in a direction the same as (shown in FIG. 5) or opposite to (not shown in FIG. 2) the feed flow.

Step 5—Evacuation (Evac.): The $CO_2$ VPSA bed, which is now at or close to ambient pressure (e.g., about 15 psia), is evacuated to a predetermined low pressure in a direction opposite to the feed flow (shown in FIG. 5). The evacuation stream 4 (FIG. 1) constitutes $CO_2$ product.

Step 6—Pressure Equalization of Evacuated Bed (PEv): The evacuated bed is now pressure equalized using the depressurized gas from Step 4 in a direction the same as (not shown in FIG. 5) or opposite to (shown in FIG. 5) the feed flow. This step helps to increase $CO_2$ recovery.

Step 7—Pressure Equalization 1 (PE1): The $CO_2$ VPSA bed is further pressure equalized using the depressurized gas from Step 2 in a direction the same as (not shown in FIG. 5) or opposite to (shown in FIG. 5) the feed flow. This step further helps to enhance $CO_2$ and $H_2$ recovery.

Step 8—Repressurization (RP): The pressure equalized $CO_2$ VPSA bed is repressurized to feed pressure either by the feed gas 1 or by part of the effluent generated in Step 1. Following repressurization to feed pressure, this bed is now ready to repeat the cycle starting at Step 1.

Option-b in FIG. 5 is a variation of Option a, wherein an idle time is included after evacuation (Step 5).

Referring now to FIG. 6, a cycle step chart for a ten-step process that utilizes seven beds, partial recycle, two pressure equalization steps and equalization with an evacuated bed is shown. These cycle steps are carried out in a similar manner to those steps described above with reference to FIG. 5, except that there is an additional depressurization step (DP 4). More specifically, the cycle steps for FIG. 6, Option a include the following:

Step 1—Feed Step (Feed): A feed stream 1 (shown in FIG. 1) containing at least carbon dioxide and hydrogen gases at a high pressure between about 100-500 psia (for example, about 300 psia) and produced by the shift reactor 24 is diverted to the $CO_2$ VPSA unit 21 of the present invention. High-pressure effluent 6 (i.e., a $H_2$-enriched stream) from the $CO_2$ VPSA unit 21 is sent to the $H_2$ PSA unit 22, which in turn produces high-pressure, high purity hydrogen product 8. After a predetermined time or after $CO_2$ breakthrough from the bed on the feed stream 10, the feed step is terminated.

Step 2—Depressurization 1 (DP1): The $CO_2$ VPSA bed, which has finished the feed step is now at high feed pressure (e.g., 100-500 psia), is depressurized to a medium pressure (e.g., 80-400 psia) in a direction the same (shown in FIG. 6) or opposite to (not shown in FIG. 6) the feed flow.

Step 3—Depressurization 2 (DP2): The $CO_2$ VPSA bed, which is now at some medium pressure (e.g., 80-400 psia), is further depressurized to a lower pressure (e.g., 60-300 psia) in a direction the same as (shown in FIG. 6) or opposite to (not shown in FIG. 6) the feed flow.

Step 4—Depressurization 3 and Recycle (Recy.): The $CO_2$ VPSA bed, which is now at a pressure lower than at the start of Step 3 (e.g., 80-400 psia), is further depressurized to a lower pressure (e.g., 15-100 psia), in a direction the same as or opposite to the feed flow. This further depressurized stream 5 (FIG. 1) is compressed and mixed with fresh feed 2 and this mixed stream 10 is fed to the $CO_2$ VPSA unit 21.

Step 5—Depressurization 4 (DP4): depressurizing the at least one adsorption bed in a fourth depressurization step from the fourth pressure to a fifth pressure within a fifth pressure range (e.g., 10-20 psia) wherein the fifth pressure is lower than the fourth pressure, and in a same direction as the feed flow or in a direction opposite the feed flow. The $CO_2$ VPSA bed, which is now at the fourth pressure range (e.g., 15-100 psia), is further depressurized to a lower pressure (e.g., 10-20 psia), in a direction the same as (shown in FIG. 6) or opposite to (not shown in FIG. 6) the feed flow.

Step 6—Evacuation (Evac.): The $CO_2$ VPSA bed, which is now at or close to ambient pressure (e.g., 10-20 psia), is evacuated to a predetermined low pressure in a direction opposite to the feed flow (shown in FIG. 6). The evacuation stream 4 (FIG. 1) constitutes $CO_2$ product.

Step 7—Pressure Equalization of Evacuated Bed (PEv): The evacuated bed is now pressure equalized from the depressurized gas from Step 5 in a direction the same as (not shown in FIG. 6) or opposite to (shown in FIG. 6) the feed flow. This step helps to increase $CO_2$ recovery.

Step 8—Pressure Equalization 2 (PE2): The $CO_2$ VPSA bed is pressure equalized using the gas stream of Step 3 in a direction the same as (not shown in FIG. 2) or opposite to (shown in FIG. 6) the feed flow. This step also helps to enhance $CO_2$ and $H_2$ recovery.

Step 9—Pressure Equalization 1 (PE1): The $CO_2$ VPSA bed is further pressure equalized using the gas stream of Step 2 in a direction the same as (not shown in FIG. 6) or opposite to (shown in FIG. 6) the feed flow. This step further helps to enhance $CO_2$ and $H_2$ recovery.

Step 10—Repressurization (RP): The pressure equalized $CO_2$ VPSA bed is repressurized to feed pressure either by the feed gas 1 or by part of the effluent generated in Step 1. Following repressurization to feed pressure, this bed is now ready to repeat the cycle starting at Step 1.

Option b in FIG. 6 is a variation of Option a, wherein an idle time is included after evacuation (Step 6).

Referring now to FIG. 7, a cycle step chart for a nine-step process that utilizes five beds, partial recycle and two pressure equalization steps is shown. These cycle steps are carried out in a similar to those steps described above with reference to FIG. 2, except that the pressurization of the evacuated bed (PEv) is replaced by a blow down step (BD). More specifically, the cycle steps for FIG. 7 include the following:

Step 1—Feed Step (Feed): A feed stream 1 (shown in FIG. 1) containing at least carbon dioxide and hydrogen gases at a high pressure between about 100-500 psia (for example, about 300 psia) and produced by the shift reactor 24 is diverted to the $CO_2$ VPSA unit 21 of the present invention. High-pressure effluent 6 (i.e., a $H_2$-enriched stream) from the $CO_2$ VPSA unit 21 is sent to the $H_2$ PSA unit 22, which in turn produces high-pressure, high purity hydrogen product 8. After a predetermined time or after $CO_2$ breakthrough from the bed on the feed stream 10, the feed step is terminated.

Step 2—Depressurization 1 (DP1): The $CO_2$ VPSA bed, which has finished the feed step is now at high feed pressure (e.g., 100-500 psia), is depressurized to a medium pressure (e.g., 80-400 psia) in a direction the same (shown in FIG. 7) or opposite to (not shown in FIG. 7) the feed flow.

Step 3—Depressurization 2 (DP2): The $CO_2$ VPSA bed, which is now at some medium pressure (e.g., 80-400 psia), is further depressurized to a lower pressure (e.g., 60-300 psia) in a direction the same as (shown in FIG. 7) or opposite to (not shown in FIG. 7) the feed flow.

Step 4—Depressurization 3 and Recycle (Recy.): The $CO_2$ VPSA bed, which is now at a pressure lower than at the start of Step 3 (e.g., 60-300 psia), is further depressurized to a lower pressure (e.g., 50-200 psia), in a direction the same as or opposite to the feed flow. This further depressurized stream 5 (FIG. 1) is compressed and mixed with fresh feed 2 and this mixed stream 10 is fed to the $CO_2$ VPSA unit 21.

Step 5—Blowdown (BD): The $CO_2$ VPSA bed, which is at a lower pressure (e.g., 50-200 psia), is now further depressurized to close to ambient pressure (e.g., about 15 psia) in a direction the same or opposite to the feed flow to produce $CO_2$ product 4 as shown in FIG. 1.

Step 6—Evacuation (Evac.): The $CO_2$ VPSA bed, which is now at or close to ambient pressure (e.g., about 15 psia), is evacuated to a predetermined low pressure in a direction opposite to the feed flow (shown in FIG. 7). The evacuation stream 4 (FIG. 1) constitutes $CO_2$ product.

Step 7—Pressure Equalization 2 (PE2): The $CO_2$ VPSA bed is pressure equalized using the gas stream of Step 3 in a direction the same as (not shown in FIG. 7) or opposite to (shown in FIG. 7) the feed flow. This step helps to enhance $CO_2$ and $H_2$ recovery.

Step 8—Pressure Equalization 1 (PE1): The $CO_2$ VPSA bed is further pressure equalized using the gas stream of Step 2 in a direction the same as (not shown in FIG. 7) or opposite to (shown in FIG. 7) the feed flow. This step further helps to enhance $CO_2$ and $H_2$ recovery.

Step 9—Repressurization (RP): The pressure equalized $CO_2$ VPSA bed is repressurized to feed pressure either by the feed gas 1 or by part of the effluent generated in Step 1. Following repressurization to feed pressure, this bed is now ready to repeat the cycle starting at Step 1.

Referring now to FIG. 8, a cycle step chart for an eleven-step process that utilizes six beds, partial recycle and three pressure equalization steps is shown. These cycle steps are carried out in a similar manner to those steps described above with reference to FIG. 7, except that there is an additional depressurization step (DP3) and an additional pressure equalization step (PE3). More specifically, the cycle steps for FIG. 8 include the following:

Step 1—Feed Step (Feed): A feed stream 1 (shown in FIG. 1) containing at least carbon dioxide and hydrogen gases at a high pressure between about 100-500 psia (e.g., about 300 psia) and produced by the shift reactor 24 is diverted to the $CO_2$ VPSA unit 21 of the present invention. High-pressure effluent 6 (i.e., a $H_2$-enriched stream) from the $CO_2$ VPSA unit 21 is sent to the $H_2$ PSA unit 22, which in turn produces high-pressure, high purity hydrogen product 8. After a predetermined time or after $CO_2$ breakthrough from the bed on the feed stream 10, the feed step is terminated.

Step 2—Depressurization 1 (DP1): The $CO_2$ VPSA bed, which has finished the feed step is now at high feed pressure (e.g., 100-500 psia), is depressurized to a medium pressure (e.g., 80-400 psia) in a direction the same as (shown in FIG. 8) or opposite to (not shown in FIG. 8) the feed flow.

Step 3—Depressurization 2 (DP2): The $CO_2$ VPSA bed, which is now at some medium pressure (e.g., 80-400 psia), is further depressurized to a lower pressure (e.g., 60-300 psia) in a direction the same as (shown in FIG. 8) or opposite to (not shown in FIG. 8) the feed flow.

Step 4—Depressurization 3 (DP3): The $CO_2$ VPSA bed, which is now at a lower pressure (e.g., 60-300 psia), is depressurized to an even lower pressure (e.g., 50-200 psia) in a direction the same as (shown in FIG. 8) or opposite to (not shown in FIG. 8) the feed flow.

Step 5—Depressurization 4 and Recycle (Recy.): The $CO_2$ VPSA bed, which is now at a pressure lower than at the start of Step 4 (e.g., 50-200 psia), is further depressurized to pressure (e.g., 40-100 psia), in a direction the same as or opposite to the feed flow. This further depressurized stream is compressed and mixed with fresh feed 2 and this mixed stream 10 is fed to the $CO_2$ VPSA unit 21 as shown in FIG. 1.

Step 6—Blowdown (BD): The $CO_2$ VPSA bed, which is at a lower pressure (e.g., 40-100 psia), is now further depressurized to close to ambient pressure (e.g., about 15 psia) in a direction the same or opposite to the feed flow to produce $CO_2$ product 4 shown in FIG. 1.

Step 7—Evacuation (Evac.): The $CO_2$ VPSA bed, which is now at or close to ambient pressure (e.g., about 15 psia), is evacuated to a predetermined low pressure in a direction opposite to the feed flow (shown in FIG. 8). The evacuation stream 4 (FIG. 1) constitutes $CO_2$ product.

Step 8—Pressure Equalization 3 (PE3): The $CO_2$ VPSA bed is pressure equalized using the gas stream from Step 4 in a direction the same as (not shown in FIG. 8) or opposite to (shown in FIG. 8) the feed flow. This step also helps to enhance $CO_2$ and $H_2$ recovery.

Step 9—Pressure Equalization 2 (PE2): The $CO_2$ VPSA bed is further pressure equalized using the gas stream from Step 3 in a direction the same as (not shown in FIG. 8) or opposite to (shown in FIG. 8) the feed flow. This step further helps to enhance $CO_2$ and $H_2$ recovery.

Step 10—Pressure Equalization 1 (PE1): The $CO_2$ VPSA bed is further pressure equalized using the gas stream from Step 2 in a direction the same as (not shown in FIG. 8) or opposite to (shown in FIG. 8) the feed flow. This step further helps to enhance $CO_2$ and $H_2$ recovery.

Step 11—Repressurization (RP): repressurizing the at least one adsorption bed in a repressurization step to the first pressure range. The pressure equalized $CO_2$ VPSA bed is repressurized to feed pressure either by the feed gas 1 or by part of the effluent generated in Step 1. Following repressurization to feed pressure, this bed is now ready to repeat the cycle starting at Step 1.

In another embodiment of the present invention, the processes provide for total recycle of the $CO_2$-rich stream back into the $CO_2$ VPSA unit (see for example, FIGS. 9 and 10). These embodiments can be accomplished using a varying number of beds and pressure equalization steps. For example, the total recycle can be accomplished with five beds and two pressure equalization steps (FIG. 9). Alternatively, total recycle can be accomplished with six beds and three pressure equalization steps (FIG. 10).

Referring to FIG. 9, a cycle step chart for an eight-step process that utilizes five beds, total recycle and two pressure equalization steps is shown. More specifically, the cycle steps for FIG. 9 include the following:

Step 1—Feed Step (Feed): A feed stream 1 (shown in FIG. 1) containing at least carbon dioxide and hydrogen gases at a high pressure between about 100-500 psia (for example, about 300 psia) and produced by the shift reactor 24 is diverted to the $CO_2$ VPSA unit 21 of the present invention. High-pressure effluent 6 (i.e., a $H_2$-enriched stream) from the $CO_2$ VPSA unit 21 is sent to the $H_2$ PSA unit 22, which in turn produces high-pressure, high purity hydrogen product 8. After a predetermined time or after $CO_2$ breakthrough from the bed on the feed stream 10, the feed step is terminated.

Step 2—Depressurization 1 (DP1): The $CO_2$ VPSA bed, which has finished the feed step is now at high feed pressure (e.g., 100-500 psia), is depressurized to a medium pressure (e.g., 80-400 psia) in a direction the same as (shown in FIG. 9) or opposite to (not shown in FIG. 9) the feed flow.

Step 3—Depressurization 2 (DP2): The $CO_2$ VPSA bed, which is now at some medium pressure (e.g., 80-400 psia), is further depressurized to a lower pressure (e.g., 60-300 psia) in a direction the same as (shown in FIG. 9) or opposite to (not shown in FIG. 9) the feed flow.

Step 4—Depressurization 3 and Recycle (Recy.): The $CO_2$ VPSA bed, which is now at a pressure lower than at the start of Step 3 (e.g., 60-300 psia), is further depressurized to at or near ambient pressure (e.g., about 15 psia), in a direction the same as or opposite to the feed flow. This further depressurized stream 5 (FIG. 1) is compressed and mixed with fresh feed 2 and this mixed stream 10 is fed to the $CO_2$ VPSA unit 21.

Step 5—Evacuation (Evac.): The $CO_2$ VPSA bed, which is now at or close to ambient pressure (e.g., about 15 psia), is evacuated to a predetermined low pressure in a direction opposite to the feed flow (shown in FIG. 9). The evacuation stream 4 (FIG. 1) constitutes $CO_2$ product.

Step 6—Pressure Equalization 2 (PE2): The $CO_2$ VPSA bed is pressure equalized in a direction the same as (not shown in FIG. 9) or opposite to (shown in FIG. 9) the feed flow. This step also helps to enhance $CO_2$ and $H_2$ recovery.

Step 7—Pressure Equalization 1 (PE1): The $CO_2$ VPSA bed is further pressure equalized in a direction the same as (not shown in FIG. 9) or opposite to (shown in FIG. 9) the feed flow. This step further helps to enhance $CO_2$ and $H_2$ recovery.

Step 8—Repressurization (RP): The pressure equalized $CO_2$ VPSA bed is repressurized to feed pressure either by the feed gas 1 or by part of the effluent generated in Step 1. Following repressurization to feed pressure, this bed is now ready to repeat the cycle starting at Step 1.

Referring now to FIG. 10, a cycle step chart for a ten-step process that utilizes six beds, total recycle and three pressure equalization steps is shown. More specifically, the cycle steps for FIG. 10 include the following:

Step 1—Feed Step (Feed): A feed stream 1 (shown in FIG. 1) containing at least carbon dioxide and hydrogen gases at a high pressure between about 100-500 psia (for example, about 300 psia) and produced by the shift reactor 24 is diverted to the $CO_2$ VPSA unit 21 of the present invention. High-pressure effluent 6 (i.e., a $H_2$-enriched stream) from the $CO_2$ VPSA unit 21 is sent to the $H_2$ PSA unit 22, which in turn produces high-pressure, high purity hydrogen product 8. After a predetermined time or after $CO_2$ breakthrough from the bed on the feed stream 10, the feed step is terminated.

Step 2—Depressurization 1 (DP1): The $CO_2$ VPSA bed, which has finished the feed step is now at high feed pressure (e.g., 100-500 psia), is depressurized to a medium pressure (e.g., 80-400 psia) in a direction the same as (shown in FIG. 10) or opposite to (not shown in FIG. 10) the feed flow.

Step 3—Depressurization 2 (DP2): The $CO_2$ VPSA bed, which is now at some medium pressure (e.g., 80-400 psia), is further depressurized to a lower pressure (e.g., 60-300 psia) in a direction the same as (shown in FIG. 10) or opposite to (not shown in FIG. 10) the feed flow.

Step 4—Depressurization 3 (DP3): The $CO_2$ VPSA bed, which is now at a lower pressure (e.g., 60-300 psia), is depressurized to an even lower pressure (e.g., 50-200 psia) in a direction the same as (shown in FIG. 10) or opposite to (not shown in FIG. 10) the feed flow.

Step 5—Depressurization 4 and Recycle (Recy.): The $CO_2$ VPSA bed, which is now at a pressure lower than at the start of Step 4 (e.g., 50-200 psia), is further depressurized to at or near ambient pressure (e.g., about 15 psia), in a direction the same as or opposite to the feed flow. This further depressurized stream 5 (FIG. 1) is compressed and mixed with fresh feed 2 and this mixed stream 10 is fed to the $CO_2$ VPSA unit 21.

Step 6—Evacuation (Evac.): The $CO_2$ VPSA bed, which is now at or close to ambient pressure (e.g., about 15 psia), is evacuated to a predetermined low pressure in a direction opposite to the feed flow (shown in FIG. 10). The evacuation stream 4 (FIG. 1) constitutes $CO_2$ product.

Step 7—Pressure Equalization 3 (PE3): The $CO_2$ VPSA bed is pressure equalized in a direction the same as (not shown in FIG. 10) or opposite to (shown in FIG. 10) the feed flow. This step also helps to enhance $CO_2$ and $H_2$ recovery.

Step 8—Pressure Equalization 2 (PE2): The $CO_2$ VPSA bed is further pressure equalized in a direction the same as (not shown in FIG. 10) or opposite to (shown in FIG. 10) the feed flow. This step further helps to enhance $CO_2$ and $H_2$ recovery.

Step 9—Pressure Equalization 1 (PE1): The $CO_2$ VPSA bed is further pressure equalized in a direction the same as (not shown in FIG. 10) or opposite to (shown in FIG. 10) the feed flow. This step further helps to enhance $CO_2$ and $H_2$ recovery.

Step 10—Repressurization (RP): The pressure equalized $CO_2$ VPSA bed is repressurized to feed pressure either by the feed gas 1 or by part of the effluent generated in Step 1. Following repressurization to feed pressure, this bed is now ready to repeat the cycle starting at Step 1.

EXAMPLE

The process cycle shown in FIG. 2 was tested on a single-bed bench scale unit and is expected to readily scale up. The inner diameter (ID) of the column was 0.68 inch and the packed bed height was 5 feet. The column was packed with about 0.5 lb of commercially available 1/16" NaY pellets. The feed contained 74.9% helium (to simulate hydrogen for safety reasons), 20.1% $CO_2$, and 5% $CH_4$ (to simulate $CH_4$+CO+$N_2$). The feed was at 300 psia. The process was run in a cyclic manner until it reached cyclic steady state. The bed was depressurized to 15 psia. This was followed by evacuation to approximately 4 psia. The quantity and concentration of the depressurized and evacuated gas was measured. Total $CO_2$ produced from Step 5 was about 0.8 mmol/lb at approximately 99% $CO_2$ purity. $CO_2$ recovery was estimated to be about 90%.

The processes described above may be operated at feed pressures higher than 100 psia, and more preferably greater than 300 psia. $CO_2$ in the feed gas should preferably be higher than 10 mole percent, and most preferably greater than 15 mole percent (e.g., 15-25 mole percent). Feed temperature may be between about 40-200° F., more preferably between about 60-150° F., and most preferably about 100° F.

In alternative embodiments of the present invention, storage tanks may be added in place of some of the adsorbent beds in the process cycle to store some of the intermediate gas streams such as the depressurized gas. The purpose of these storage tanks is to maintain flow into and out of the $CO_2$ VPSA unit as continuous.

The present invention thus provides processes and apparatus for the recovery of high purity (e.g., approximately ≧90 mole %) carbon dioxide from syngas. In accordance with preferred embodiments of the present invention, there is constant feed, constant product being produced and rotating machinery is preferably run continuously so as to eliminate unnecessary tank(s). If, however, there are reasons for limiting the number of adsorbent beds (e.g., high cost of the adsorbent) storage tanks instead of the adsorbent vessels may be used as explained above. While every bed will perform the same cycle, the number of beds is to be minimized taking these factors into consideration.

The feed to the $CO_2$ VPSA unit can be at super ambient pressure, and the $CO_2$ product can be produced as described above. When the $CO_2$ VPSA unit is installed upstream of a $H_2$ PSA unit, hydrogen recovery is expected to increase by extracting the $CO_2$, thereby increasing hydrogen partial pressure in the $H_2$ PSA feed stream. The recovered $CO_2$ can be used as produced or further upgraded such as shown in commonly owned U.S. patent application Ser. No. 11/395,137, filed on Apr. 3, 2006, and entitled "Carbon Dioxide Production Method" by Shah et al., the entire contents of which are incorporated herein by reference. $CO_2$ produced in accordance with the present invention may be used for any desired purpose. For example and while not to be construed as limiting, $CO_2$ produced as described herein can be used for liquefaction to produce food-grade quality product(s), supercritical $CO_2$ for enhanced oil recovery (EOR) or simply $CO_2$ for sequestration to avoid additional green house gases in the atmosphere in order to satisfy regulatory requirements.

It will be appreciated by those skilled in the art that the present invention is not limited to embodiments where the $CO_2$ VPSA unit is placed downstream of an SMR/shift reactor and upstream of a $H_2$ PSA unit. The present invention can also be used, for example, with a partial oxidation reactor together with any feed stream as defined hereinabove.

It will also be appreciated that in some cases, the pressure equalization steps could be eliminated. In such cases, the gas that was not pressure equalized can be fed to the product stream. Consequently, $CO_2$ purity may be reduced. This may reduce hydrogen and/or carbon dioxide recovery since more hydrogen and/or carbon dioxide could be present in stream 4. In such cases, the number of beds may be reduced.

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. A vacuum pressure swing adsorption (VPSA) process for the recovery of carbon dioxide from a feed stream, wherein the feed stream comprises a multi-component gas mixture comprising at least carbon dioxide and hydrogen, in a VPSA unit comprising at least one adsorption bed containing at least one $CO_2$-selective adsorbent, the process comprising:

(a) feeding at least a portion of the feed stream to the at least one adsorption bed at a first pressure within a first pressure range for a predetermined time to produce a hydrogen-enriched stream;

(b) depressurizing the at least one adsorption bed in a first depressurization step from the first pressure to a second pressure within a second pressure range wherein the second pressure is lower than the first pressure in a same direction as or in a direction opposite to the feed flow;

(c) depressurizing the at least one adsorption bed in a second depressurization step from the second pressure to a third pressure within a third pressure range wherein the third pressure is lower than the second pressure and in a same direction as or in a direction opposite to the feed flow;

(d) depressurizing the at least one adsorption bed in a third depressurization step from the third pressure to a fourth pressure within a fourth pressure range wherein the fourth pressure is lower than the third pressure and close to ambient pressure, and in a same direction as the feed flow or in a direction opposite the feed flow to produce a $CO_2$-rich stream, wherein a first portion of the $CO_2$-rich stream is compressed and recycled into the feed stream and feeding the feed stream with said recycled first portion to the at least one adsorption bed at a first pressure within a first pressure range for a predetermined time to produce a hydrogen-enriched stream; and (e) evacuating the at least one adsorption bed from the fourth pressure range to a pressure below ambient in a direction opposite to or in a same direction as the feed flow to produce $CO_2$ product;

(f) feeding a second portion of the $CO_2$-rich stream of step (d) to the at least one adsorption bed at a pressure below ambient to equalize the pressure in said bed;

(g) pressure equalizing the at least one adsorption bed in a second pressure equalization step in a direction opposite to or in a same direction as the feed flow;

(h) further pressure equalizing the at least one adsorption bed in a third pressure equalization step in a direction opposite to or in a same direction as the feed flow; and (i) repressurizing the at least one adsorption bed in a repressurization step to the first pressure range;

wherein the process is repeated cyclically.

2. The process of claim 1, wherein the VPSA unit comprises six adsorbent beds.

3. The process of claim 1, wherein the first pressure range is 100-500 psia.

4. The process of claim 1, wherein the first pressure is greater than 300 psia.

5. The process of claim 1, wherein the second pressure range is 80-400 psia.

6. The process of claim 1, wherein the third pressure range is 60-300 psia.

7. The process of claim 1, wherein the fourth pressure range is 15-40 psia.

8. The process of claim 1, wherein the multi-component gas mixture comprises at least 10 mole percent of carbon dioxide.

9. The process of claim 1, wherein the multi-component gas mixture comprises at least 20 mole percent of carbon dioxide.

10. The process of claim 1, wherein the multi-component gas mixture is fed into the VPSA unit at a temperature within the range of 40-200° F.

11. The process of claim 10, wherein the temperature is about 100° F.

12. A vacuum pressure swing adsorption (VPSA) process for the recovery of carbon dioxide from a feed stream, wherein the feed stream comprises a multi-component gas mixture comprising at least carbon dioxide and hydrogen, in a VPSA unit comprising at least one adsorption bed containing at least one $CO_2$-selective adsorbent, the process comprising:

(a) feeding at least a portion of the feed stream to the at least one adsorption bed at a first pressure within a first pressure range for a predetermined time to produce a hydrogen-enriched stream;

(b) depressurizing the at least one adsorption bed in a first depressurization step from the first pressure to a second pressure within a second pressure range wherein the second pressure is lower than the first pressure in a same direction as or in a direction opposite to the feed flow;

(c) depressurizing the at least one adsorption bed in a second depressurization step from the second pressure to a third pressure within a third pressure range wherein the third pressure is lower than the second pressure and in a same direction as or in a direction opposite to the feed flow to produce a $CO_2$-rich stream, wherein the $CO_2$-rich stream is compressed and recycled into the feed stream, and feeding the feed stream with said recycled $CO_2$-rich stream to the at least one adsorption bed at a first pressure within a first pressure range for a predetermined time to produce a hydrogen-enriched stream;

(d) depressurizing the at least one adsorption bed in a third depressurization step from the third pressure to a fourth pressure within a fourth pressure range wherein the fourth pressure is lower than the third pressure and in a same direction as or in a direction opposite to the feed flow;

(e) evacuating the at least one adsorption bed from the fourth pressure range to a pressure below ambient in a direction opposite to or in a same direction as the feed flow to produce $CO_2$ product;

(f) feeding depressurized gas from step (d) to the at least one adsorption bed at a pressure below ambient to equalize the pressure in said bed;

(g) further pressure equalizing the at least one adsorption bed in a second pressure equalization step in a direction opposite to or in a same direction as the feed flow;

(h) repressurizing the at least one adsorption bed in a repressurization step to the first pressure range;

wherein the process is repeated cyclically.

13. The process of claim 12, wherein the VPSA unit comprises six adsorbent beds.

14. The process of claim 12, wherein the first pressure range is 100-500 psia.

15. The process of claim 12, wherein the first pressure is greater than 300 psia.

16. The process of claim 12, wherein the second pressure range is 80-400 psia.

17. The process of claim 12, wherein the third pressure range is 15-60 psia.

18. The process of claim 12, wherein the fourth pressure range is 10-40 psia.

19. The process of claim 12, wherein the process further comprises the at least one adsorption bed being idle after evacuation.

20. The process of claim 12, wherein the multi-component gas mixture comprises at least 10 mole percent of carbon dioxide.

21. The process of claim 12, wherein the multi-component gas mixture comprises at least 20 mole percent of carbon dioxide.

22. The process of claim 12, wherein the multi-component gas mixture is fed into the VPSA unit at a temperature within the range of 40-200° F.

23. The process of claim 21, wherein the temperature is about 100° F.

24. A vacuum pressure swing adsorption (VPSA) process for the recovery of carbon dioxide from a feed stream, wherein the feed stream comprises a multi-component gas mixture comprising at least carbon dioxide and hydrogen, in a VPSA unit comprising at least one adsorption bed containing at least one $CO_2$-selective adsorbent, the process comprising:

(a) feeding at least a portion of the feed stream to the at least one adsorption bed at a first pressure within a first pressure range for a predetermined time to produce a hydrogen-enriched stream;

(b) depressurizing the at least one adsorption bed in a first depressurization step from the first pressure to a second pressure within a second pressure range wherein the second pressure is lower than the first pressure in a same direction as or in a direction opposite to the feed flow;

(c) depressurizing the at least one adsorption bed in a second depressurization step from the second pressure to a third pressure within a third pressure range wherein the third pressure is lower than the second pressure and in a same direction as or in a direction opposite to the feed flow;

(d) depressurizing the at least one adsorption bed in a third depressurization step from the third pressure to a fourth pressure within a fourth pressure range wherein the fourth pressure is lower than the third pressure and in a same direction as or in a direction opposite to the feed flow to produce a $CO_2$-rich stream, wherein the $CO_2$-rich stream is compressed and recycled into the feed stream, and feeding the feed stream with said recycled $CO_2$-rich stream to the at least one adsorption bed at a first pressure within a first pressure range for a predetermined time to produce a hydrogen-enriched stream;

(e) depressurizing the at least one adsorption bed in a fourth depressurization step from the fourth pressure to a fifth pressure within a fifth pressure range wherein the fifth pressure is lower than the fourth pressure and in a same direction as or in a direction opposite to the feed flow;

(f) evacuating the at least one adsorption bed from the fourth pressure range to a pressure below ambient in a direction opposite to or in a same direction as the feed flow to produce $CO_2$product;

(g) feeding depressurized gas from step (e) to the at least one adsorption bed at a pressure below ambient to equalize the pressure in said bed;

(h) further pressure equalizing the at least one adsorption bed in a second pressure equalization step in a direction opposite to or in a same direction as the feed flow;

(i) further pressure equalizing the at least one adsorption bed in a third pressure equalization step in a direction opposite to or in a same direction as the feed flow;

(j) repressurizing the at least one adsorption bed in a repressurization step to the first pressure range;

wherein the process is repeated cyclically.

25. The process of claim 24, wherein the VPSA unit comprises seven adsorbent beds.

26. The process of claim 24, wherein the first pressure range is 100-500 psia.

27. The process of claim 24, wherein the first pressure is greater than 300 psia.

28. The process of claim 24, wherein the second pressure range is 80-400 psia.

29. The process of claim 24, wherein the third pressure range is 60-300 psia.

30. The process of claim 24, wherein the fourth pressure range is 15-100 psia.

31. The process of claim 24, wherein the fifth pressure range is 10-20 psia.

32. The process of claim 1, wherein the process further comprises the at least one adsorption bed being idle after evacuation.

33. The process of claim 24, wherein the multi-component gas mixture comprises at least 10 mole percent of carbon dioxide.

34. The process of claim 24, wherein the multi-component gas mixture comprises at least 20 mole percent of carbon dioxide.

35. The process of claim 24, wherein the multi-component gas mixture is fed into the VPSA unit at a temperature within the range of 40-200° F.

36. The process of claim 35, wherein the temperature is about 100° F.

37. A vacuum pressure swing adsorption (VPSA) process for the recovery of carbon dioxide from a feed stream, wherein the feed stream comprises a multi-component gas mixture comprising at least carbon dioxide and hydrogen, in a VPSA unit comprising at least one adsorption bed containing at least one $CO_2$-selective adsorbent, the process comprising:

(a) feeding at least a portion of the feed stream to the at least one adsorption bed at a first pressure within a first pressure range for a predetermined time to produce a hydrogen-enriched stream;

(b) depressurizing the at least one adsorption bed in a first depressurization step from the first pressure to a second pressure within a second pressure range wherein the second pressure is lower than the first pressure in a same direction as or in a direction opposite to the feed flow;

(c) depressurizing the at least one adsorption bed in a second depressurization step from the second pressure to a third pressure within a third pressure range wherein the third pressure is lower than the second pressure and in a same direction as or in a direction opposite to the feed flow;

(d) depressurizing the at least one adsorption bed in a third depressurization step from the third pressure to a fourth pressure within a fourth pressure range wherein the fourth pressure is lower than the third pressure, and in a same direction as the feed flow or in a direction opposite the feed flow to produce a $CO_2$-rich stream, wherein the $CO_2$-rich stream is compressed and recycled into the feed stream and feeding the feed stream with said recycled first portion to the at least one adsorption bed at a first pressure within a first pressure range for a predetermined time to produce a hydrogen-enriched stream; and (e) depressurizing the at least one adsorbent bed in a blowdown step from the fourth pressure to a fifth pressure within a fifth pressure range, wherein the fifth pressure is lower than the fourth pressure;

(f) evacuating the at least one adsorption bed from the fifth pressure range to a pressure below ambient in a direction opposite to or in a same direction as the feed flow to produce $CO_2$ product;

(g) pressure equalizing the at least one adsorption bed in a first pressure equalization step in a direction opposite to or in a same direction as the feed flow;

(h) further pressure equalizing the at least one adsorption bed in a second pressure equalization step in a direction opposite to or in a same direction as the feed flow; and (i) repressurizing the at least one adsorption bed in a repressurization step to the first pressure range;

wherein the process is repeated cyclically.

38. The process of claim 37, wherein the VPSA unit comprises five adsorbent beds.

39. The process of claim 37, wherein the first pressure range is 100-500 psia.

40. The process of claim 37, wherein the first pressure is greater than 300 psia.

41. The process of claim 37, wherein the second pressure range is 80-400 psia.

42. The process of claim 37, wherein the third pressure range is 60-300 psia.

43. The process of claim 37, wherein the fourth pressure range is 50-200 psia.

44. The process of claim 37, wherein the fifth pressure about 15 psia.

45. The process of claim 37, wherein the multi-component gas mixture comprises at least 10 mole percent of carbon dioxide.

46. The process of claim 37, wherein the multi-component gas mixture comprises at least 20 mole percent of carbon dioxide.

47. The process of claim 37, wherein the multi-component gas mixture is fed into the VPSA unit at a temperature within the range of 40-200° F.

48. The process of claim 47, wherein the temperature is about 100° F.

49. A vacuum pressure swing adsorption (VPSA) process for the recovery of carbon dioxide from a feed stream, wherein the feed stream comprises a multi-component gas mixture comprising at least carbon dioxide and hydrogen, in a VPSA unit comprising at least one adsorption bed containing at least one $CO_2$-selective adsorbent, the process comprising:

(a) feeding at least a portion of the feed stream to the at least one adsorption bed at a first pressure within a first pressure range for a predetermined time to produce a hydrogen-enriched stream;

(b) depressurizing the at least one adsorption bed in a first depressurization step from the first pressure to a second pressure within a second pressure range wherein the second pressure is lower than the first pressure in a same direction as or in a direction opposite to the feed flow;

(c) depressurizing the at least one adsorption bed in a second depressurization step from the second pressure to a third pressure within a third pressure range wherein the third pressure is lower than the second pressure and in a same direction as or in a direction opposite to the feed flow;

(d) depressurizing the at least one adsorption bed in a third depressurization step from the third pressure to a fourth pressure within a fourth pressure range wherein the fourth pressure is lower than the third pressure and in a same direction as or in a direction opposite to the feed flow;

(e) depressurizing the at least one adsorption bed in a fourth depressurization step from the fourth pressure to a fifth pressure within a fifth pressure range wherein the fifth pressure is lower than the fourth pressure and in a same direction as or in a direction opposite to the feed flow to produce a $CO_2$-rich stream, wherein the $CO_2$-rich stream is compressed and recycled into the feed stream, and feeding the feed stream with said recycled $CO_2$-rich stream to the at least one adsorption bed at a first pressure within a first pressure range for a predetermined time to produce a hydrogen-enriched stream;

(f) depressurizing the at least one adsorbent bed in a blowdown step from the fifth pressure to a sixth pressure within a sixth pressure range, wherein the sixth pressure is lower than the fifth pressure;

(g) evacuating the at least one adsorption bed from the sixth pressure range to a pressure below ambient in a direction opposite to or in a same direction as the feed flow to produce $CO_2$ product;

(h) pressure equalizing the at least one adsorption bed in a first pressure equalization step in a direction opposite to or in the same direction as the feed flow;

(i) further pressure equalizing the at least one adsorption bed in a second pressure equalization step in a direction opposite to or in a same direction as the feed flow;

(j) further pressure equalizing the at least one adsorption bed in a third pressure equalization step in a direction opposite to or in a same direction as the feed flow;

(k) repressurizing the at least one adsorption bed in a repressurization step to the first pressure range;

wherein the process is repeated cyclically.

50. The process of claim 49, wherein the VPSA unit comprises six adsorbent beds.

51. The process of claim 49, wherein the first pressure range is 100-500 psia.

52. The process of claim 49, wherein the first pressure is greater than 300 psia.

53. The process of claim 49, wherein the second pressure range is 80-400 psia.

54. The process of claim 49, wherein the third pressure range is 60-300 psia.

55. The process of claim 49, wherein the fourth pressure range is 50-200 psia.

56. The process of claim 49, wherein the fifth pressure range is 40-100 psia.

57. The process of claim 49, wherein the sixth pressure is about 15 psia.

58. The process of claim 49, wherein the multi-component gas mixture comprises at least 10 mole percent of carbon dioxide.

59. The process of claim 49, wherein the multi-component gas mixture comprises at least 20 mole percent of carbon dioxide.

60. The process of claim 49, wherein the multi-component gas mixture is fed into the VPSA unit at a temperature within the range of 40-200° F.

61. The process of claim 60, wherein the temperature is about 100° F.

62. A vacuum pressure swing adsorption (VPSA) process for the recovery of carbon dioxide from a feed stream, wherein the feed stream comprises a multi-component gas mixture comprising at least carbon dioxide and hydrogen, in a VPSA unit comprising at least one adsorption bed containing at least one $CO_2$-selective adsorbent, the process comprising:

(a) feeding at least a portion of the feed stream to the at least one adsorption bed at a first pressure within a first pressure range for a predetermined time to produce a hydrogen-enriched stream;

(b) depressurizing the at least one adsorption bed in a first depressurization step from the first pressure to a second pressure within a second pressure range wherein the second pressure is lower than the first pressure in a same direction as or in a direction opposite to the feed flow;

(c) depressurizing the at least one adsorption bed in a second depressurization step from the second pressure to a third pressure within a third pressure range wherein the third pressure is lower than the second pressure and in a same direction as or in a direction opposite to the feed flow;

(d) depressurizing the at least one adsorption bed in a third depressurization step from the third pressure to a fourth pressure within a fourth pressure range wherein the fourth pressure is lower than the third pressure and in a same direction as or in a direction opposite to the feed flow to produce a $CO_2$-rich stream, wherein the $CO_2$-rich stream is compressed and recycled into the feed stream, and feeding the feed stream with said recycled $CO_2$-rich stream to the at least one adsorption bed at a first pressure within a first pressure range for a predetermined time to produce a hydrogen-enriched stream;

(e) evacuating the at least one adsorption bed from the fourth pressure range to a pressure below ambient in a direction opposite to or in a same direction as the feed flow to produce $CO_2$ product;

(f) pressure equalizing the at least one adsorption bed in a first pressure equalization step in a direction opposite to or in the same direction as the feed flow;

(g) further pressure equalizing the at least one adsorption bed in a second pressure equalization step in a direction opposite to or in a same direction as the feed flow;

(h) repressurizing the at least one adsorption bed in a repressurization step to the first pressure range;

wherein the process is repeated cyclically.

63. The process of claim 62, wherein the VPSA unit comprises five adsorbent beds.

64. The process of claim 62, wherein the first pressure range is 100-500 psia.

65. The process of claim 62, wherein the first pressure is greater than 300 psia.

66. The process of claim 62, wherein the second pressure range is 80-400 psia.

67. The process of claim 62, wherein the third pressure range is 60-300 psia.

68. The process of claim 62, wherein the fourth pressure range is 50-200 psia.

69. The process of claim 62, wherein the fifth pressure is about 15 psia.

70. The process of claim 62, wherein the multi-component gas mixture comprises at least 10 mole percent of carbon dioxide.

71. The process of claim 62, wherein the multi-component gas mixture comprises at least 20 mole percent of carbon dioxide.

72. The process of claim 62, wherein the multi-component gas mixture is fed into the VPSA unit at a temperature within the range of 40-200° F.

73. The process of claim 72, wherein the temperature is about 100° F.

74. A vacuum pressure swing adsorption (VPSA) process for the recovery of carbon dioxide from a feed stream, wherein the feed stream comprises a multi-component gas mixture comprising at least carbon dioxide and hydrogen, in a VPSA unit comprising at least one adsorption bed containing at least one $CO_2$-selective adsorbent, the process comprising:

(a) feeding at least a portion of the feed stream to the at least one adsorption bed at a first pressure within a first pressure range for a predetermined time to produce a hydrogen-enriched stream;

(b) depressurizing the at least one adsorption bed in a first depressurization step from the first pressure to a second pressure within a second pressure range wherein the second pressure is lower than the first pressure in a same direction as or in a direction opposite to the feed flow;

(c) depressurizing the at least one adsorption bed in a second depressurization step from the second pressure to a third pressure within a third pressure range wherein the third pressure is lower than the second pressure and in a same direction as or in a direction opposite to the feed flow;

(d) depressurizing the at least one adsorption bed in a third depressurization step from the third pressure to a fourth pressure within a fourth pressure range wherein the fourth pressure is lower than the third pressure and in a same direction as or in a direction opposite to the feed flow;

(e) depressurizing the at least one adsorption bed in a fourth depressurization step from the fourth pressure to a fifth pressure within a fifth pressure range wherein the fifth pressure is lower than the fourth pressure and in a same direction as or in a direction opposite to the feed flow to produce a $CO_2$-rich stream, wherein the $CO_2$-rich stream is compressed and recycled into the feed stream, and feeding the feed stream with said recycled $CO_2$-rich stream to the at least one adsorption bed at a first pressure within a first pressure range for a predetermined time to produce a hydrogen-enriched stream;

(f) evacuating the at least one adsorption bed from the fifth pressure range to a pressure below ambient in a direction opposite to or in a same direction as the feed flow to produce $CO_2$product;

(g) pressure equalizing the at least one adsorption bed in a first pressure equalization step in a direction opposite to or in the same direction as the feed flow;

(h) further pressure equalizing the at least one adsorption bed in a second pressure equalization step in a direction opposite to or in a same direction as the feed flow;

(i) further pressure equalizing the at least one adsorption bed in a third pressure equalization step in a direction opposite to or in a same direction as the feed flow; and (j) repressurizing the at least one adsorption bed in a repressurization step to the first pressure range;

wherein the process is repeated cyclically.

75. The process of claim 74, wherein the VPSA unit comprises six adsorbent beds.

76. The process of claim 74, wherein the first pressure range is 100-500 psia.

77. The process of claim 74, wherein the first pressure is greater than 300 psia.

78. The process of claim 74, wherein the second pressure range is 80-400 psia.

79. The process of claim 74, wherein the third pressure range is 60-300 psia.

80. The process of claim 74, wherein the fourth pressure range is 50-200 psia.

81. The process of claim 74, wherein the fifth pressure is about 15 psia.

82. The process of claim 74, wherein the multi-component gas mixture comprises at least 10 mole percent of carbon dioxide.

83. The process of claim 74, wherein the multi-component gas mixture comprises at least 20 mole percent of carbon dioxide.

84. The process of claim 74, wherein the multi-component gas mixture is fed into the VPSA unit at a temperature within the range of 40-200° F.

85. The process of claim 84, wherein the temperature is about 100° F.

* * * * *